(12) United States Patent
Sullivan

(10) Patent No.: US 11,303,351 B2
(45) Date of Patent: Apr. 12, 2022

(54) USER MOBILITY IN A SYSTEM WITH TIME-VARYING USER-SATELLITE AND SATELLITE-GROUND ETHERNET LINKS

(71) Applicant: The Boeing Company, Chicago, IL (US)

(72) Inventor: Scott C. Sullivan, South Pasadena, CA (US)

(73) Assignee: The Boeing Company, Chicago, IL (US)

( * ) Notice: Subject to any disclaimer, the term of this patent is extended or adjusted under 35 U.S.C. 154(b) by 80 days.

(21) Appl. No.: 16/808,131

(22) Filed: Mar. 3, 2020

(65) Prior Publication Data
US 2021/0281316 A1 Sep. 9, 2021

(51) Int. Cl.
*H04B 7/185* (2006.01)
*H04L 12/46* (2006.01)
*H04W 88/16* (2009.01)

(52) U.S. Cl.
CPC ..... *H04B 7/18513* (2013.01); *H04L 12/4641* (2013.01); *H04L 2212/00* (2013.01); *H04W 88/16* (2013.01)

(58) Field of Classification Search
CPC ............ H04B 7/18513; H04L 12/4641; H04L 2212/00; H04W 88/16
See application file for complete search history.

(56) References Cited

U.S. PATENT DOCUMENTS

| | | | | |
|---|---|---|---|---|
| 2007/0147279 A1* | 6/2007 | Smith | ..................... | H04L 12/66 370/316 |
| 2007/0255829 A1* | 11/2007 | Pecus | ..................... | H04L 45/00 709/225 |
| 2014/0355516 A1* | 12/2014 | Baudoin | ................. | H04L 69/22 370/316 |
| 2015/0382240 A1* | 12/2015 | Hecht | ..................... | H04L 69/18 370/316 |

* cited by examiner

*Primary Examiner* — Kevin C. Harper
*Assistant Examiner* — Derrick V Rose
(74) *Attorney, Agent, or Firm* — Haynes and Boone, LLP

(57) ABSTRACT

Systems, methods, and apparatus for user mobility in a system with time-varying user-satellite and satellite-ground Ethernet links are disclosed. In some embodiments, A method for user mobility in a satellite system comprises transmitting, by a user device, a first signal comprising internet protocol (IP) data packets encapsulated in an Ethernet frame to a satellite. The method further comprises transmitting, by the satellite, a second signal comprising the IP data packets encapsulated in the Ethernet frame to a ground modem of a ground terminal. Further, the method comprises transmitting, by the ground modem, a third signal comprising the IP data packets encapsulated in the Ethernet frame to a default gateway, which is associated with user device, of a customer ground location via a virtual Ethernet switch. The virtual Ethernet switch utilizes one of a layer two (L2) overlay or a wide area network (WAN) L2 virtual private network (VPN) implementation.

20 Claims, 11 Drawing Sheets

700

USER MOBILITY IN A SYSTEM WITH TIME-VARYING USER-SATELLITE AND SATELLITE-GROUND ETHERNET LINKS

FIELD

The subject disclosure relates to user mobility in a satellite system. In particular, the subject disclosure relates to user mobility in a system with time-varying user-satellite and satellite-ground Ethernet links.

BACKGROUND

Traditionally, in satellite systems with time-varying user-to-satellite and satellite-to-ground terminal links, dynamic routing protocols are typically used to advertise user subnets when user devices (e.g., user devices associated with users) attach to each gateway (e.g., a ground terminal attachment point). This approach requires user devices to run a dynamic routing protocol and/or the ground terminal to make a configuration change to advertise the appropriate internet protocol (IP) subnet(s). This approach is complex and imposes routing protocol requirements on user devices, ground terminals, and terrestrial internet service providers (ISP).

SUMMARY

The subject disclosure relates to a method, system, and apparatus for user mobility in a system with time-varying user-satellite and satellite-ground Ethernet links. In one or more embodiments, a method for user mobility in a satellite system comprises transmitting, by a user device (e.g., user equipment, which is associated with a user), a first signal comprising internet protocol (IP) data packets encapsulated in an Ethernet frame to a satellite. The method further comprises transmitting, by the satellite, a second signal comprising the IP data packets encapsulated in the Ethernet frame to a ground terminal. Also, the method comprises putting, by a first virtual extensible local area network (VXLAN) switch associated with the ground terminal, the Ethernet frame of the IP data packets into a user datagram protocol (UDP) payload. In addition, the method comprises putting, by the first VXLAN switch, the UDP payload into the IP data packets to generate a third signal comprising the IP data packets comprising the UDP payload. Also, the method comprises transmitting, by the first VXLAN switch, a third signal to a customer ground location via IP transport over a wide area network (WAN). Additionally, the method comprises de-encapsulating, by a second VXLAN switch associated with the customer ground location, the Ethernet frame from the third signal to generate a fourth signal comprising the IP data packets encapsulated in the Ethernet frame. Further, the method comprises transmitting, by the second VXLAN switch, the fourth signal to a default gateway associated with the user device.

In one or more embodiments, the first VXLAN switch and the second VXLAN switch are each a layer three (L3) switch with VXLAN capability. In at least one embodiment, the first signal and the second signal are each one of a radio frequency (RF) signal or an optical signal. In some embodiments, the satellite is a geostationary Earth orbit (GEO) satellite, a medium Earth orbit (MEO) satellite, or a low Earth orbit (LEO) satellite.

In at least one embodiment, the satellite transmits the second signal to a ground modem of the ground terminal. In some embodiments, the method further comprises transmitting, by the ground modem, a fifth signal comprising the IP data packets encapsulated in the Ethernet frame to the first VXLAN switch.

In one or more embodiments, the first VXLAN switch transmits the third signal to the customer ground location via a first customer edge (CE) router associated with the ground terminal and a second CE router associated with the customer ground location.

In at least one embodiment, the user device and the default gateway are associated with the same virtual local area network (VLAN). In some embodiments, the default gateway is associated with an IP address assigned to the user device. In one or more embodiments, the user device is associated with a customer, which is associated with the customer ground location.

In one or more embodiments, the method further comprises ceasing transmitting, by the user device, the first signal to the satellite; and transmitting, by the user device, the first signal to another satellite, where communication associated with the user device is rerouted to the other satellite without utilizing a dynamic routing protocol. In some embodiments, the method further comprises ceasing transmitting, by the satellite, the second signal to the ground terminal; and transmitting, by the satellite, the second signal to another ground terminal, where communication associated with the user device is rerouted to the other ground terminal via the satellite without utilizing a dynamic routing protocol.

In at least one embodiment, a method for user mobility in a satellite system comprises transmitting, by a user device (e.g., user equipment, which is associated with a user), a first signal comprising internet protocol (IP) data packets encapsulated in an Ethernet frame to a satellite. The method further comprises transmitting, by the satellite, a second signal comprising the IP data packets encapsulated in the Ethernet frame to a ground terminal. Also, the method comprises putting, by a first provider edge (PE) router, the Ethernet frame of the IP data packets into a multi-protocol label switching (MPLS) payload to generate a third signal comprising MPLS data packets. In addition, the method comprises transmitting, by the first PE router, the third signal to a second PE router via a MPLS layer two (L2) virtual private network (VPN). Additionally, the method comprises de-encapsulating, by the second PE router, the Ethernet frame from the third signal to generate a fourth signal comprising the IP data packets encapsulated in the Ethernet frame. Further, the method comprises transmitting, by the second PE router, the fourth signal to a default gateway associated with the user device.

In one or more embodiments, the ground terminal comprises a first switch and a customer ground location comprises a second switch, and where the first switch and the second switch are each a layer two (L2) switch.

In at least one embodiment, the satellite transmits the second signal to a ground modem of the ground terminal. In one or more embodiments, the method further comprises transmitting, by the ground modem, a fifth signal comprising the IP data packets encapsulated in the Ethernet frame to a first switch of the ground terminal.

In one or more embodiments, a first switch of the ground terminal transmits a sixth signal comprising the IP data packets encapsulated in the Ethernet frame to the first PE router.

In some embodiments, a system comprises a processor and a memory that stores executable instructions that, when executed by the processor, facilitate performance of operations, comprising: receiving, by a ground modem of a ground terminal, a first signal comprising internet protocol (IP) data packets encapsulated in an Ethernet frame, where the receiving comprises receiving the first signal from a user device (e.g., user equipment) via a satellite; and transmitting, by the ground modem, a second signal comprising the IP data packets encapsulated in the Ethernet frame to a default gateway device via a virtual Ethernet switch, where the default gateway device comprises a gateway device of a customer ground location associated with the user device, where the virtual Ethernet switch utilizes one of a layer two (L2) overlay or a wide area network (WAN) L2 virtual private network (VPN) implementation.

In one or more embodiments, a method for user mobility comprises transmitting, by a user device (e.g., user equipment), a first signal comprising internet protocol (IP) data packets encapsulated in an Ethernet frame to a satellite. The method further comprises transmitting, by the satellite, a second signal comprising the IP data packets encapsulated in the Ethernet frame to a ground modem of a ground terminal. Further, the method comprises transmitting, by the ground modem, a third signal comprising the IP data packets encapsulated in the Ethernet frame to a default gateway, which is associated with a user device, of a customer ground location via a virtual Ethernet switch. In one or more embodiments, the virtual Ethernet switch utilizes one of a layer two (L2) overlay or a wide area network (WAN) L2 virtual private network (VPN) implementation.

The features, functions, and advantages can be achieved independently in various embodiments of the subject disclosure or may be combined in yet other embodiments.

DRAWINGS

These and other features, aspects, and advantages of the subject disclosure will become better understood with regard to the following description, appended claims, and accompanying drawings where:

DESCRIPTION

Figure 1:
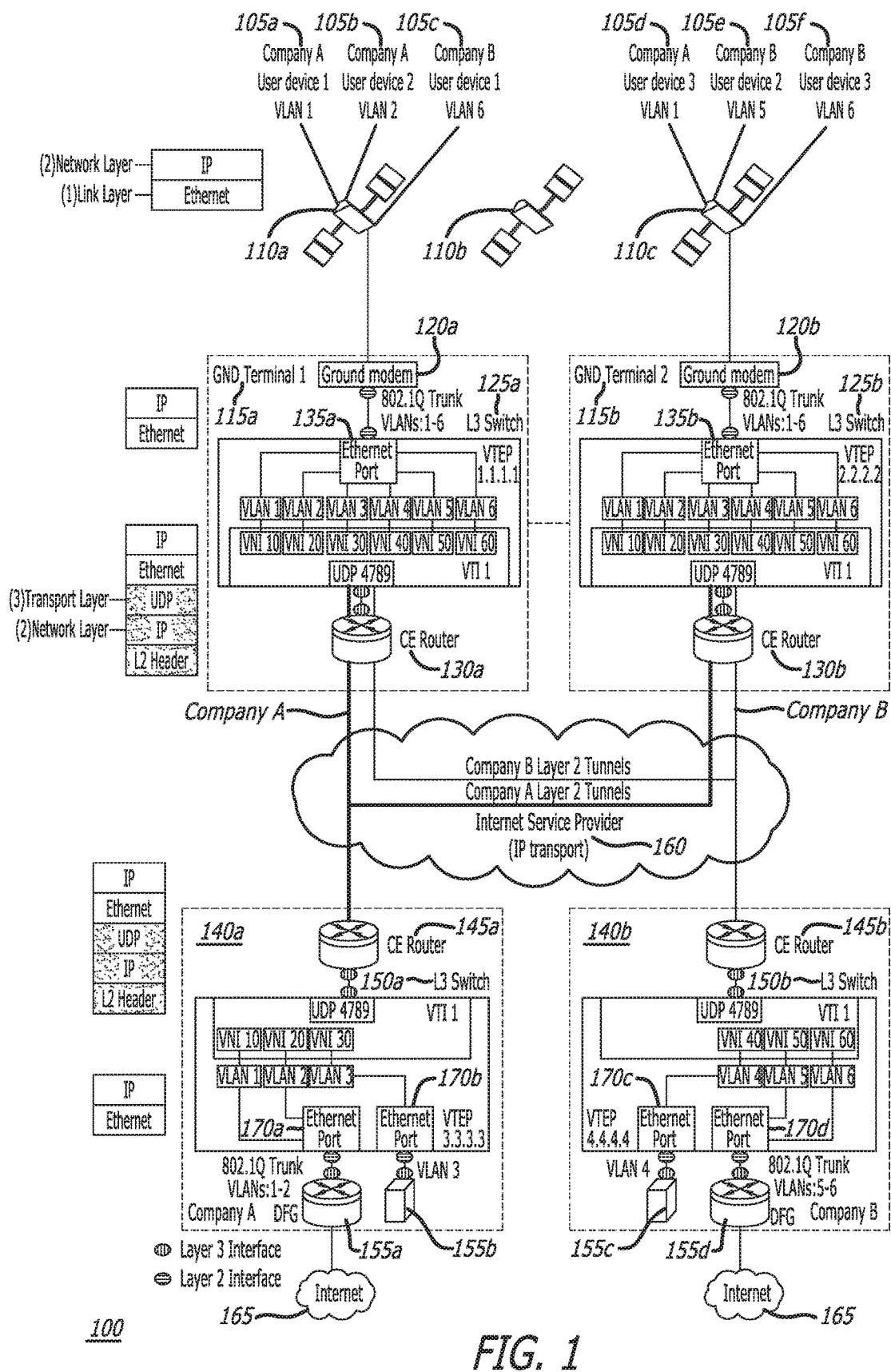
FIG. 1 is a diagram showing the disclosed system for user mobility in a system with time-varying user-satellite and satellite-ground Ethernet links utilizing a virtual extensible local area network (VXLAN) configuration, in accordance with at least one embodiment of the subject disclosure.

The methods and apparatus disclosed herein provide an operative system for user mobility in a system with time-varying user-satellite and satellite-ground Ethernet links. In particular, the system of the subject disclosure provides a simplified user mobility solution in a system with time-varying user-to-satellite and satellite-to-user ground terminal links. In particular, the disclosed system provides a terrestrial-based layer two (L2) overlay network that enables seamless user mobility (e.g., a user device connecting to a different satellite or a satellite connecting to a different ground terminal) without the use of dynamic routing protocols to update user device location (e.g., a ground terminal attachment point). Additionally, the disclosed system enables end-to-end L2 logical isolation (end-to-end including space and ground) for greater security control.

The disclosed system provides logical isolation of traffic, and does not impose routing protocol requirements on terrestrial internet service providers as the system provides a L2 overlay, which does not require network configuration changes to advertise user subnet(s) from the appropriate attached ground antenna. The disclosed system eliminates dynamic routing protocol re-convergence of user device IP prefixes as user devices move between gateways.

As previously mentioned above, conventionally, dynamic routing protocols are typically used to advertise user subnet (s) when user devices (e.g., user devices associated with users) attach to each gateway. This conventional approach requires user devices to run a dynamic routing protocol and/or the ground terminal to make a configuration change to advertise the appropriate IP subnet(s). This conventional approach is complex and imposes routing protocol requirements on user devices, ground terminals, and terrestrial internet service providers.

Conversely, the disclosed system does not rely on a routing protocol to function. The disclosed system eliminates the complexities by treating the user devices as Ethernet end-hosts, and when user devices attach to a ground terminal, treating that connectivity as an L2 connection to an Ethernet switch. When a user device moves between ground terminals, that is essentially equivalent to end-hosts moving ports on an Ethernet switch. The user device's new location is learned via existing mechanisms associated with an L2 Ethernet learning switch provided by a L2 overlay (e.g., refer to FIG. 1, which utilizes a virtual extensible local area network (VXLAN) configuration) or by a wide area network (WAN) virtual private network (VPN) implementation (e.g., refer to FIG. 3, which utilizes a multi-protocol label switching (MPLS) L2 VPN configuration), which both allow for the elimination of a dynamic routing protocol.

The disclosed design is analogous to the user device connecting to a L2 switch versus a layer three (L3) router at a connected ground terminal. The mobility is analogous to a user device moving from an Ethernet port A to an Ethernet port B on the same Ethernet switch (in the same virtual local area network (VLAN)). Being an overlay solution, the Ethernet switch ports can be at different locations (e.g., different ground antenna locations and/or ground user device locations/network gateways). The disclosed system provides end-to-end logical isolation of user and/or mission data, ground terminal management, satellite telemetry, tracking, and command (TT&C), payload TT&C, and/or payload management traffic.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the subject disclosure may be described herein in terms of functional and/or logical components and various processing steps. It should be appreciated that such components may be realized by any number of hardware, software, and/or firmware components configured to perform the specified functions. For example, an embodiment of the subject disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the subject disclosure may be practiced in conjunction with other components, and that the systems described herein are merely example embodiments of the subject disclosure.

For the sake of brevity, conventional techniques and components related to reflectors and detectors, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the subject disclosure.

FIG. 1 is a diagram showing the disclosed system 100 for user mobility in a system with time-varying user-satellite and satellite-ground Ethernet links utilizing a virtual extensible local area network (VXLAN) configuration, in accordance with at least one embodiment of the subject disclosure. In this figure, six user devices (e.g., Company A User Device 1 105*a*, Company A User Device 2 105*b*, Company B User Device 1 105*c*, Company A User Device 3 105*d*, Company B User Device 2 105*e*, and Company B User Device 3 105*f*) are shown. Each user device 105*a*, 105*b*, 105*c*, 105*d*, 105*e*, 105*f* is associated with one of two companies (e.g., Company A or Company B). In one or more embodiments, each user device 105*a*, 105*b*, 105*c*, 105*d*, 105*e*, 105*f* is a terrestrial user device (e.g., a stationary user device, such as home location device or a building location device; or a mobile user device, such as a vehicle or a mobile device), a space user device (e.g., a satellite, such as a geostationary Earth orbit (GEO) satellite, a medium Earth orbit (MEO) satellite, or a low Earth orbit (LEO) satellite), or an airborne user device (e.g., an aircraft). Each user device 105*a*, 105*b*, 105*c*, 105*d*, 105*e*, 105*f* is assigned an IP address from a subnet assigned to a specific company VLAN (e.g., VLAN 1, VLAN 2, VLAN 3, VLAN 4, VLAN 5, or VLAN 6). Three of the VLANs (e.g., VLAN 1, VLAN 2, and VLAN 3) are assigned to Company A, and the other three VLANs (e.g., VLAN 4, VLAN 5, and VLAN 6) are assigned to Company B.

It should be noted that in other embodiments, the system 100 may comprise more or less user devices 105*a*, 105*b*, 105*c*, 105*d*, 105*e*, 105*f* than six user devices as shown in FIG. 1. Also, in one or more embodiments, the system 100 may comprise more or less companies than two companies as shown in FIG. 1.

Also in FIG. 1, three satellites 110*a*, 110*b*, 110*c* are shown. Each of the satellites 110*a*, 110*b*, 110*c* may be a LEO satellite, a MEO satellite, or a GEO satellite. In one or more embodiments, all three of the satellites 110*a*, 110*b*, 110*c* are in the same satellite constellation (e.g., a GEO satellite constellation). It should be noted that, in other embodiments, the system 100 may comprise more or less satellites 110*a*, 110*b*, 110*c* than three satellites as shown in FIG. 1.

Each of the user devices 105*a*, 105*b*, 105*c*, 105*d*, 105*e*, 105*f* is in communication with one of the satellites 110*a*, 110*c* that is within the user device's view (e.g., Company A User Device 1 105*a* is in communication with satellite 110*a*, Company A User Device 2 105*b* is in communication with satellite 110*a*, Company B User Device 1 105*c* is in communication with satellite 110*a*, Company A User Device 3 105*d* is in communication with satellite 110*c*, Company B User Device 2 105*e* is in communication with satellite 110*c*, and Company B User Device 3 105*f* is in communication with satellite 110*c*), as shown in FIG. 1.

Each of the satellites 110*a*, 110*c* is in communication with a ground (GND) terminal 115*a*, 115*b* that is within the satellite's view (e.g., satellite 110*a* is in communication with ground terminal 1 115*a*, and satellite 110*c* is in communication with ground terminal 2 115*b*), as shown in FIG. 1. It should be noted that in other embodiments, the system 100 may comprise more or less ground terminals 115*a*, 115*b* than two ground terminals as shown in FIG. 1.

VXLAN capable switches (e.g., a VXLAN L3 switch) 125*a*, 125*b* are deployed at ground terminals 115*a*, 115*b*. Each ground terminal 115*a*, 115*b* comprises a ground modem 120*a*, 120*b*, a VXLAN capable switch 125*a*, 125*b*, and a customer edge (CE) router 130*a*, 130*b*.

Each VXLAN capable switch 125*a*, 125*b* is configured to support all six VLANs (e.g., VLAN 1, VLAN 2, VLAN 3, VLAN 4, VLAN 5, and VLAN 6). This means that user devices 105*a*, 105*b*, 105*c*, 105*d*, 105*e*, 105*f* from either company (e.g., Company A or Company B) can connect to any ground terminal 115*a*, 115*b*. In addition, each VXLAN capable switch 125*a*, 125*b* operates as a virtual tunnel end point (VTEP) (which has an assigned IP address, such as 1.1.1.1 and 2.2.2.2), and comprises a virtual tunnel interface (VTI) comprising virtual network interfaces (VNIs) (e.g., VNI 10, VNI 20, VNI 30, VNI 40, VNI 50, VNI 60) to support tunneling. In addition, each VXLAN capable switch 125*a*, 125*b* supports user datagram protocol (UDP) (e.g., UDP 4789).

An L2 interface of each ground modem 120*a*, 120*b* is connected to an L2 interface of each VXLAN capable switch 125a, 125b via an 802.1Q Trunk (for VLANs 1 through 6). And, an L3 interface of each VXLAN capable switch 125a, 125b is connected to an L3 interface of each CE router 130a, 130b. Each VXLAN capable switch 125a, 125b comprises an Ethernet port 135a, 135b, which comprises an L2 interface.

Each CE router 130a, 130b of each ground terminal 115a, 115b is in communication with a customer ground location 140a, 140b via a network (e.g., a wide area network (WAN), such as the Internet) 160. Each customer ground location (e.g., company headquarters) 140a, 140b is associated with a company (e.g., customer ground location 140a is associated with Company A, and customer ground location 140b is associated with Company B). Customer ground locations 140a, 140b are assigned VLANs and IP subnets for their user devices by a system operator (e.g., customer ground location 140a for Company A is assigned VLAN 1, VLAN 2, and VLAN 3; and customer ground location 140b for Company B is assigned VLAN 4, VLAN 5, and VLAN 6). This allows for the companies (e.g., Company A and Company B) to use any IP addressing scheme within their assigned VLANs. It should be noted that in other embodiments, the system 100 may comprise more or less customer ground locations 140a, 140b than two customer ground locations as shown in FIG. 1.

VXLAN capable switches (e.g., a VXLAN L3 switch) 150a, 150b are deployed at the customer ground locations 140a, 140b. Each VXLAN capable switch 150a, 150b is configured to transport only their assigned VLANs (e.g., the VLANs assigned to each company). This means that user devices 105a, 105b, 105c, 105d, 105e, 105f can only connect to the customer ground location 140a, 140b assigned to the user device's company (e.g., Company A or Company B).

Each customer ground location 140a, 140b comprises a CE router 145a, 145b, a VXLAN capable switch 150a, 150b, default gateways (DFGs) 155a, 155d, and terrestrial user devices (e.g., servers, data centers, personal computers, software, etc.) 155b, 155c. The default gateways 155a, 155d in FIG. 1 are illustrated as CE routers, which are connected to the internet 165, and the terrestrial user devices 155b, 155c in FIG. 1 are illustrated as servers. Each default gateway 155a, 155d and each terrestrial user devices 155b, 155c is configured to support one or more company VLANs (e.g., default gateway 155a of Company A is configured to support VLAN 1 and VLAN 2, terrestrial user device 155b of Company A is configured to support VLAN 3, terrestrial user device 155c of Company B is configured to support VLAN 4, and default gateway 155d of Company B is configured to support VLAN 5 and VLAN 6). Each user device is associated with the same VLAN as the user device's default gateway or terrestrial user device (e.g., user device 105a and default gateway 155a are both associated with VLAN 1). Note that if a user device (e.g., assigned to VLAN 1) desires to be connected with another user device (e.g., assigned to VLAN 2) connected to a different VLAN, the user device (e.g., assigned to VLAN 1) must route through a default gateway (e.g., default gateway 155a).

Each VXLAN capable switch 150a, 150b operates as a VTEP (which has an assigned address, such as 3.3.3.3, and 4.4.4.4), and comprises a VTI comprising VNIs (e.g., VNI 10, VNI 20, VNI 30, VNI 40, VNI 50, VNI 60) to support tunneling. In addition, each VXLAN capable switch 150a, 150b supports UDP (e.g., UDP 4789).

An L3 interface of each CE router 145a, 145b is connected to an L3 interface of each VXLAN capable switch 150a, 150b. And, L2 interfaces of each VXLAN capable switch 150a, 150b are each connected to an L3 interface of each default gateway 155a, 155d or terrestrial user device 155b, 155c. In particular, the VXLAN capable switches 150a, 150b are connected to default gateways 155a, 155d via an 802.1Q Trunk (for VLANs 1 and 2, and for VLANs 5 and 6). Each VXLAN capable switch 150a, 150b comprises Ethernet ports 170a, 170b, 170c, 170d, which comprises an L2 interface.

During operation of the system 100, each user device 105a, 105b, 105c, 105d, 105e, 105f transmits a signal(s) (e.g., a first signal) comprising IP data packets encapsulated in an Ethernet frame to a satellite 110a, 110c (e.g., user devices 105a, 105b, 105c each transmit a signal(s) to satellite 110a; and user devices 105c, 105d, 105e each transmit a signal(s) to satellite 110c). Then, the satellites 110a, 110c each transmit a signal(s) (e.g., a second signal) comprising the IP data packets encapsulated in the Ethernet frame to a ground terminal 115a, 115b (e.g., satellite 110a transmits a signal(s) to ground terminal 115a; and satellite 110c transmits a signal(s) to ground terminal 115b).

It should be noted that, in one or more embodiments, the first signal and second signal are radio frequency (RF) signals and/or optical signals (e.g., lasercom). In some embodiments, the first signal and the second signal are transmitted on the same frequency band or transmitted on different frequency bands from one another.

A ground modem 120a, 120b of each of the ground terminals 115a, 115b receives the signal(s) (e.g., the second signal). The ground modems 120a, 120b of each of the ground terminals 115a, 115b processes the received signal(s) (e.g., the second signal) to generate a signal(s) (e.g., a fifth signal). An L2 interface of the ground modem 120a, 120b of each of the ground terminals 115a, 115b then transmits (via an 802.1Q Trunk) the signal(s) (e.g., the fifth signal) to an L2 interface of an Ethernet port 135a, 135b of a VXLAN capable switch 125a, 125b of each of the ground terminals 115a, 115b. Each of the VXLAN capable switches 125a, 125b then puts the Ethernet frame of the IP data packets into a UDP payload and, then puts the UDP payload into the IP data packets to generate a signal(s) (e.g., a third signal) comprising the IP data packets comprising the UDP payload.

Then, the signal(s) (e.g., the third signal) is transmitted from each of the VXLAN capable switches 125a, 125b to a CE router 145a, 145b of each customer ground location 140a, 140b via L2 tunneling through a wide area network (WAN). The CE router 145a, 145b of each of the customer ground locations 140a, 140b receives the signal(s) (e.g., the third signal). Then, the signal(s) (e.g., the third signal) is transmitted from an L3 interface of each of the CE routers 145a, 145b to an L3 interface of a VXLAN capable switch 150a, 150b of each of the customer ground locations 140a, 140b. Then, each of the VXLAN capable switches 150a, 150b de-encapsulates the Ethernet frame from the signal(s) (e.g., the third signal) to generate a signal(s) (e.g., a fourth signal) comprising the original IP data packets encapsulated in the Ethernet frame. Then, the signal(s) (e.g., the fourth signal) is then transmitted from an L2 interface of each Ethernet port 170a, 170b, 170c, 170d of the VXLAN capable switches 150a, 150b to an L3 interface of the appropriate default gateways (DFGs) 155a, 155d and terrestrial user devices 155b, 155c of the customer ground locations 140a, 140b.

Figure 2:
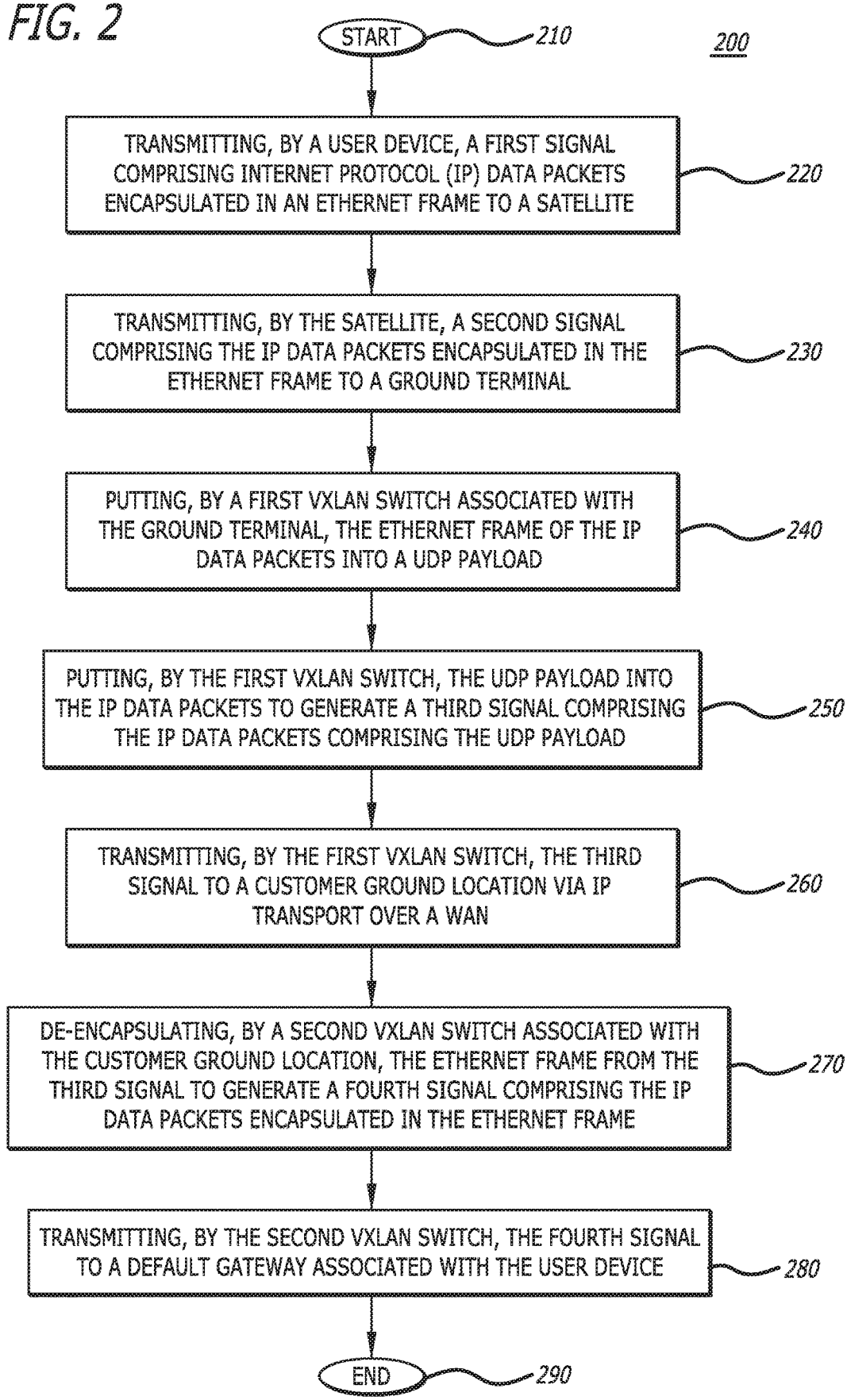
FIG. 2 is a flow chart showing the disclosed method for user mobility in a system with time-varying user-satellite and satellite-ground Ethernet links utilizing a VXLAN configuration, in accordance with at least one embodiment of the subject disclosure.

FIG. 2 is a flow chart showing the disclosed method 200 for user mobility in a system with time-varying user-satellite and satellite-ground Ethernet links utilizing a VXLAN configuration, in accordance with at least one embodiment of the subject disclosure. At the start 210 of the method 200, a user device transmits a first signal comprising IP data packets encapsulated in an Ethernet frame to a satellite 220. Then, the satellite transmits a second signal comprising the IP data packets encapsulated in the Ethernet frame to a ground terminal 230. A first VXLAN switch associated with the ground terminal then puts the Ethernet frame of the IP data packets into a UDP payload 240. Then, the VXLAN switch puts the UDP payload into the IP data packets to generate a third signal comprising the IP data packets comprising the UDP payload 250.

The first VXLAN switch then transmits the third signal to a customer ground location via IP transport over a WAN 260. Then, a second VXLAN switch associated with the customer ground location de-encapsulates the Ethernet frame from the third signal to generate a fourth signal comprising the IP data packets encapsulated in the Ethernet frame 270. Then, the second VXLAN switch transmits the fourth signal to a default gateway associated with the user device 280. Then, the method 200 ends 290.

Figure 3:
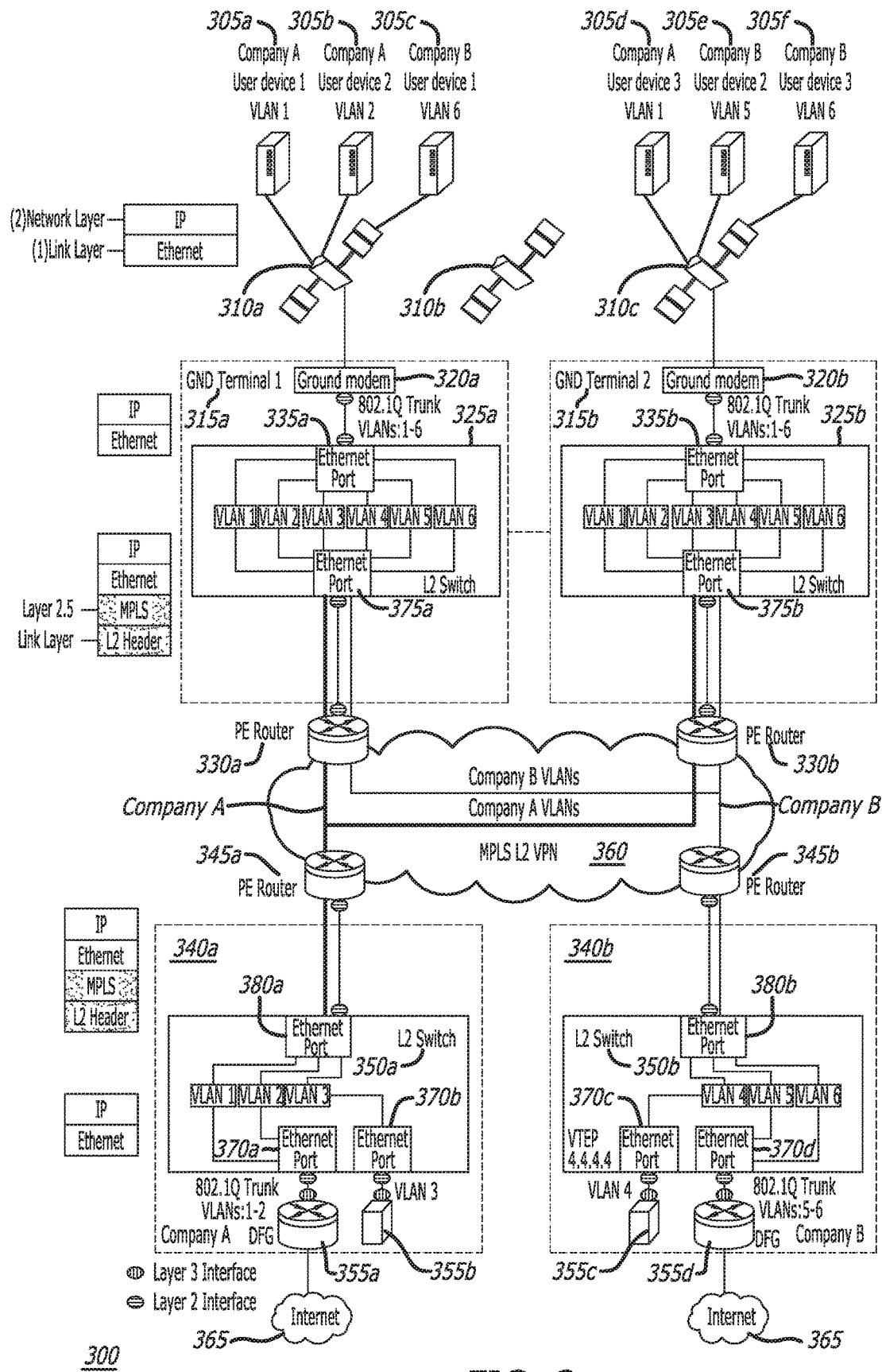
FIG. 3 is a diagram showing the disclosed system for user mobility in a system with time-varying user-satellite and satellite-ground Ethernet links utilizing a multi-protocol label switching (MPLS) layer two (L2) virtual private network (VPN) configuration, in accordance with at least one embodiment of the subject disclosure.

FIG. 3 is a diagram showing the disclosed system for user mobility in a system with time-varying user-satellite and satellite-ground Ethernet links utilizing a multi-protocol label switching (MPLS) layer two (L2) virtual private network (VPN) configuration, in accordance with at least one embodiment of the subject disclosure. In this figure, six user devices (e.g., Company A User Device 1 305a, Company A User Device 2 305b, Company B User Device 1 305c, Company A User Device 3 305d, Company B User Device 2 305e, and Company B User Device 3 305f) are shown. Each user device 305a, 305b, 305c, 305d, 305e, 305f is associated with one of two companies (e.g., Company A or Company B). In one or more embodiments, each user device 305a, 305b, 305c, 305d, 305e, 305f is a terrestrial user device (e.g., a stationary user device, such as home location device or a building location device; or a mobile user device, such as a vehicle or a mobile device), a space user device (e.g., a satellite, such as a GEO satellite, a MEO satellite, or a LEO satellite), or an airborne user device (e.g., an aircraft). Each user device 305a, 305b, 305c, 305d, 305e, 305f is assigned an IP address from a subnet assigned to a specific company VLAN (e.g., VLAN 1, VLAN 2, VLAN 3, VLAN 4, VLAN 5, or VLAN 6). Three of the VLANs (e.g., VLAN 1, VLAN 2, and VLAN 3) are assigned to Company A, and the other three VLANs (e.g., VLAN 4, VLAN 5, and VLAN 6) are assigned to Company B.

It should be noted that in other embodiments, the system 300 may comprise more or less user devices 305a, 305b, 305c, 305d, 305e, 305f than six user devices as shown in FIG. 3. In addition, in one or more embodiments, the system 300 may comprise more or less companies than two companies as shown in FIG. 3.

Also in FIG. 3, three satellites 310a, 310b, 310c are shown. Each of the satellites 310a, 310b, 310c can be a LEO satellite, a MEO satellite, or a GEO satellite. In one or more embodiments, all three of the satellites 310a, 310b, 310c are in the same satellite constellation (e.g., a GEO satellite constellation). It should be noted that, in other embodiments, the system 300 may comprise more or less satellites 310a, 310b, 310c than three satellites as shown in FIG. 3.

Each of the user devices 305a, 305b, 305c, 305d, 305e, 305f is in communication with one of the satellites 310a, 310c that is within the user device's view (e.g., Company A User Device 1 305a is in communication with satellite 310a, Company A User Device 2 305b is in communication with satellite 310a, Company B User Device 1 305c is in communication with satellite 310a, Company A User Device 3 305d is in communication with satellite 310c, Company B User Device 2 305e is in communication with satellite 310c, and Company B User Device 3 305f is in communication with satellite 310c), as shown in FIG. 3.

Each of the satellites 310a, 310c is in communication with a ground terminal 315a, 315b that is within the satellite's view (e.g., satellite 310a is in communication with ground terminal 1 315a, and satellite 310c is in communication with ground terminal 2 315b), as shown in FIG. 3. It should be noted that in other embodiments, the system 300 may comprise more or less ground terminals 315a, 315b than two ground terminals as shown in FIG. 3.

Switches (e.g., an L2 switch) 325a, 325b are deployed at ground terminals 315a, 315b. Each ground terminal 315a, 315b comprises a ground modem 320a, 320b and a switch 325a, 325b. Each switch 325a, 325b is configured to support all six VLANs (e.g., VLAN 1, VLAN 2, VLAN 3, VLAN 4, VLAN 5, and VLAN 6). This means that user devices 305a, 305b, 305c, 305d, 305e, 305f from either company (e.g., Company A or Company B) can connect to any ground terminal 315a, 315b.

An L2 interface of each ground modem 320a, 320b is connected to an L2 interface of each switch 325a, 325b via an 802.1Q Trunk (for VLANs 1 through 6). And, an L2 interface of each switch 325a, 325b is connected to an L2 interface of a provider edge (PE) router 330a, 330b. Each switch 325a, 325b comprises two Ethernet ports 335a, 335b, 375a, 375b, which each comprise an L2 interface.

Each PE router 330a, 330b is in communication with a PE router 345a, 345b via an MPLS L2 VPN network (e.g., a network that supports MPLS L2 VPN) 360. Each PE router 345a, 345b is in communication with a customer ground location 340a, 340b. Each customer ground location (e.g., company headquarters) 340a, 340b is associated with a company (e.g., customer ground location 340a is associated with Company A, and customer ground location 340b is associated with Company B). Customer ground locations 340a, 340b are assigned VLANs (and optionally IP subnets) for their user devices by a system operator (e.g., customer ground location 340a for Company A is assigned VLAN 1, VLAN 2, and VLAN 3; and customer ground location 340b for Company B is assigned VLAN 4, VLAN 5, and VLAN 6). This allows for the companies (e.g., Company A and Company B) to use any IP addressing scheme within their assigned VLANs. It should be noted that in other embodiments, the system 300 may comprise more or less customer ground locations 340a, 340b than two customer ground locations as shown in FIG. 1.

Switches (e.g., an L2 switch) 350a, 350b are deployed at the customer ground locations 340a, 340b. Each switch 350a, 350b is configured to transport only their assigned VLANs (e.g., the VLANs assigned to each company). This means that user devices 305a, 305b, 305c, 305d, 305e, 305f can only connect to the customer ground location 340a, 340b assigned to the user device's company (e.g., Company A or Company B).

Each customer ground location 340a, 340b comprises a switch 350a, 350b, default gateways (DFGs) 355a, 355d, and terrestrial user devices (e.g., servers, data centers, personal computers, software, etc.) 355b, 355c. The default gateways 355a, 355d in FIG. 3 are illustrated as CE routers, which are connected to the internet 365, and the terrestrial user devices 355b, 355c in FIG. 3 are illustrated as servers. Each default gateway 355a, 355d and each terrestrial user device 355b, 355c is configured to support one or more company VLANs (e.g., default gateway 355a of Company A is configured to support VLAN 1 and VLAN 2, terrestrial user device 355b of Company A is configured to support VLAN 3, terrestrial user device 355c of Company B is configured to support VLAN 4, and default gateway 355*d* of Company B is configured to support VLAN 5 and VLAN 6). Each user device is associated with the same VLAN as the user device's default gateway or terrestrial user device (e.g., user device 305*a* and default gateway 355*a* are both associated with VLAN 1). Note that if a user device (e.g., assigned to VLAN 1) desires to be connected with another user device (e.g., assigned to VLAN 2) connected to a different VLAN, the user device (e.g., assigned to VLAN 1) must route through a default gateway (e.g., default gateway 355*a*).

An L2 interface of each PE router 345*a*, 345*b* is connected to an L2 interface of each switch 350*a*, 350*b*. And, L2 interfaces of each switch 350*a*, 350*b* are each connected to an L3 interface of each default gateway 355*a*, 355*d* and terrestrial user device 355*b*, 355*c*. In particular, the switches 350*a*, 350*b* are connected to default gateways 355*a*, 355*d* via an 802.1Q Trunk (for VLANs 1 and 2, and for VLANs 5 and 6). Each switch 350*a*, 350*b* comprises three Ethernet ports 380*a*, 380*b*, 370*a*, 370*b*, 370*c*, 370*d*, which each comprise an L2 interface.

During operation of the system 300, each user device 305*a*, 305*b*, 305*c*, 305*d*, 305*e*, 305*f* transmits a signal(s) (e.g., a first signal) comprising IP data packets encapsulated in an Ethernet frame to a satellite 310*a*, 310*c* (e.g., user devices 305*a*, 305*b*, 305*c* each transmit a signal(s) to satellite 310*a*; and user devices 305*c*, 305*d*, 305*e* each transmit a signal(s) to satellite 310*c*). Then, the satellites 310*a*, 310*c* each transmit a signal(s) (e.g., a second signal) comprising the IP data packets encapsulated in the Ethernet frame to a ground terminal 315*a*, 315*b* (e.g., satellite 310*a* transmits a signal(s) to ground terminal 315*a*; and satellite 310*c* transmits a signal(s) to ground terminal 315*b*).

It should be noted that, in one or more embodiments, the first signal and second signal are radio frequency (RF) signals and/or optical signals (e.g., lasercom). In some embodiments, the first signal and the second signal are transmitted on the same frequency band or transmitted on different frequency bands from one another.

A ground modem 320*a*, 320*b* of each of the ground terminals 315*a*, 315*b* receives the signal(s) (e.g., the second signal). The ground modems 320*a*, 320*b* of each of the ground terminals 315*a*, 315*b* processes the received signal(s) (e.g., the second signal) to generate a signal(s) (e.g., a fifth signal). An L2 interface of the ground modem 320*a*, 320*b* of each of the ground terminals 315*a*, 315*b* then transmits (via an 802.1Q Trunk) the signal(s) (e.g., the fifth signal) to an L2 interface of an ethernet port 335*a*, 335*b* of a switch 325*a*, 325*b* of each of the ground terminals 315*a*, 315*b*. A signal(s) comprising the IP data packets encapsulated in the Ethernet frame (e.g., a sixth signal) is then transmitted from an L2 interface of an ethernet port 375*a*, 375*b* of the switch 325*a*, 325*b* of each of the ground terminals 315*a*, 315*b* to an L2 interface of a PE router 330*a*, 330*b*.

Each PE router 330*a*, 330*b* then puts the Ethernet frame of the IP data packets into a MPLS payload to generate a signal(s) (e.g., a third signal) comprising MPLS data packets. The signal(s) (e.g., the third signal) is then transmitted from PE routers 330*a*, 330*b* to PE routers 345*a*, 345*b* via an MPLS L2 VPN. PE routers 345*a*, 345*b* receive the signal(s) (e.g., the third signal). Then, each of the PE routers 345*a*, 345*b* de-encapsulates the Ethernet frame from the signal(s) (e.g., the third signal) to generate a signal(s) (e.g., a fourth signal) comprising the original IP data packets encapsulated in the Ethernet frame.

Then, the signal(s) (e.g., the fourth signal) is transmitted from an L2 interface of each of the PE routers 345*a*, 345*b* to an L2 interface of an Ethernet port 380*a*, 380*b* of a switch 350*a*, 350*b* of each of the customer ground locations 340*a*, 340*b*. Then, the signal(s) (e.g., the fourth signal) is then transmitted from an L2 interface of each Ethernet port 370*a*, 370*b*, 370*c*, 370*d* of the switches 350*a*, 350*b* to an L3 interface of the appropriate default gateways (DFGs) 355*a*, 355*d* and terrestrial user devices 355*b*, 355*c* of the customer ground locations 340*a*, 340*b*.

Figure 4:
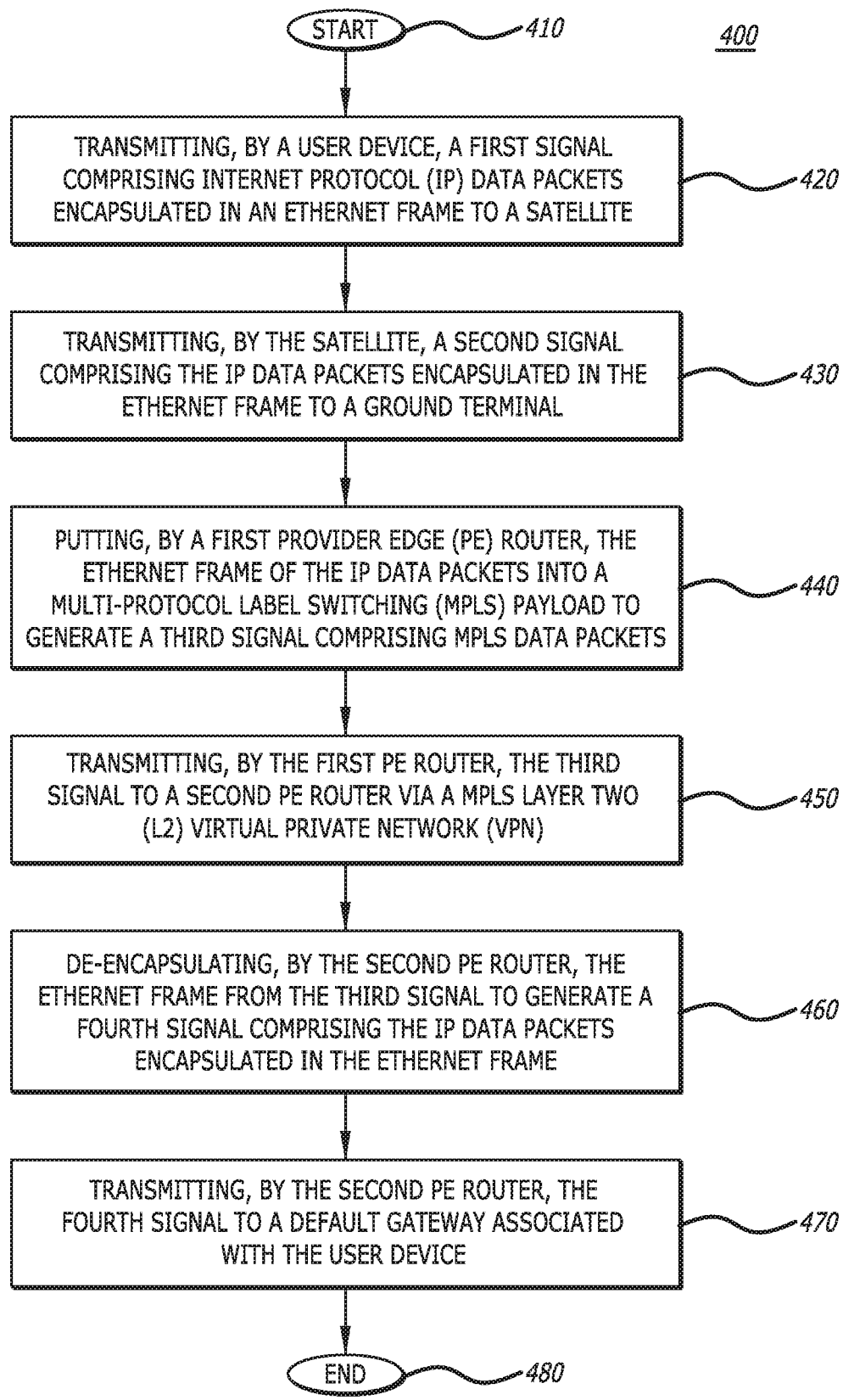
FIG. 4 is a flow chart showing the disclosed method for user mobility in a system with time-varying user-satellite and satellite-ground Ethernet links utilizing a MPLS L2 VPN configuration, in accordance with at least one embodiment of the subject disclosure.

FIG. 4 is a flow chart showing the disclosed method 400 for user mobility in a system with time-varying user-satellite and satellite-ground Ethernet links utilizing a MPLS L2 VPN configuration, in accordance with at least one embodiment of the subject disclosure. At the start 410 of the method 400, a user device transmits a first signal comprising IP data packets encapsulated in an Ethernet frame to a satellite 420. Then, the satellite transmits a second signal comprising the IP data packets encapsulated in the Ethernet frame to a ground terminal 430. A first PE router then puts the Ethernet frame of the IP data packets into a MPLS payload to generate a third signal comprising MPLS data packets 440. The first PE router then transmits the third signal to a second PE router via a MPLS L2 VPN 450. Then, the second PE router de-encapsulates the Ethernet frame from the third signal to generate a fourth signal comprising the IP data packets encapsulated in the Ethernet frame 460. Then, the second PE router transmits the fourth signal to a default gateway associated with the user device 470. Then, the method 400 ends 480.

Figure 5:
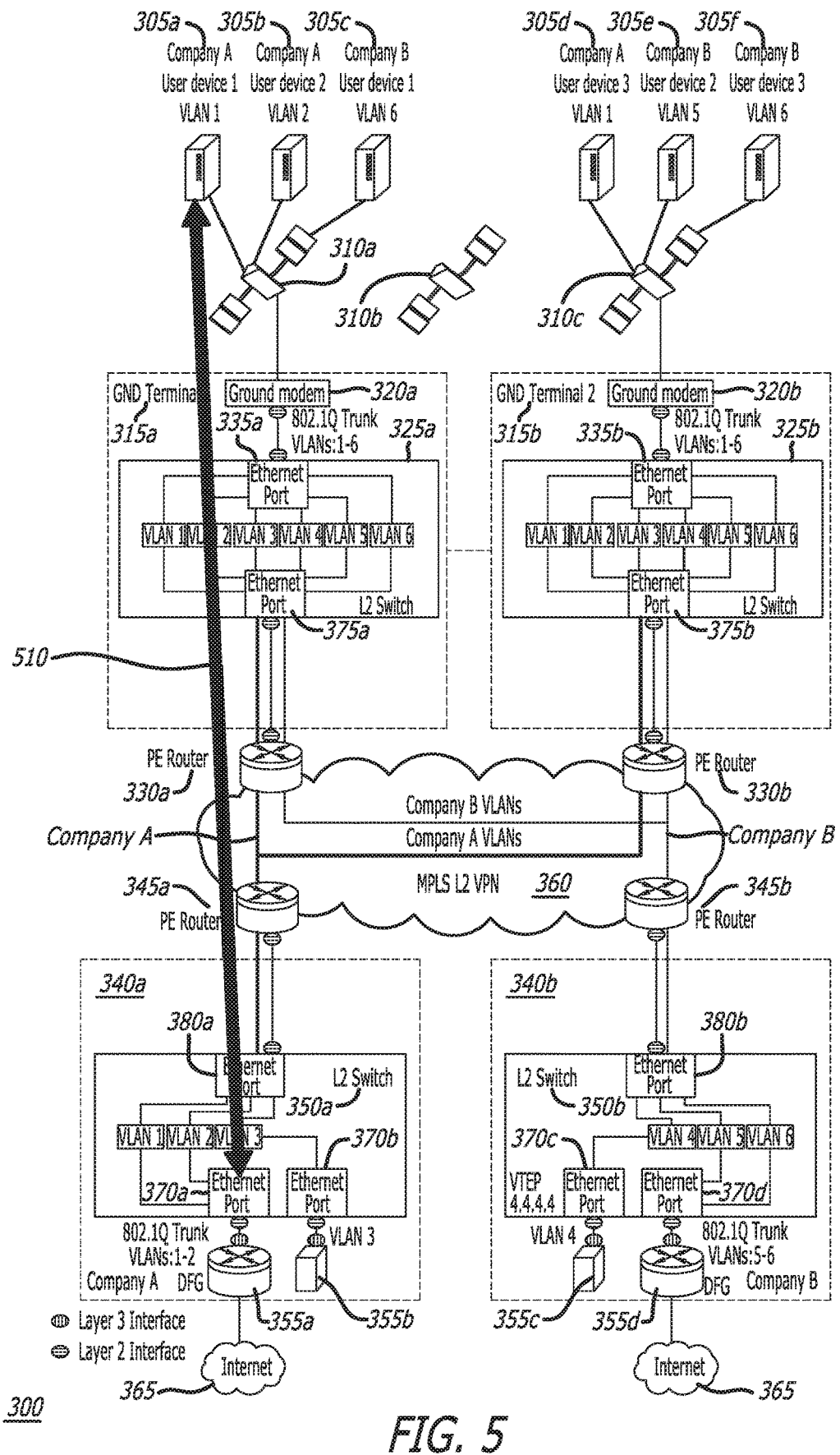
FIG. 5 is a diagram illustrating how the disclosed system provides a layer two end-to-end connection between a user device and a company ground location, in accordance with at least one embodiment of the subject disclosure.

FIG. 5 is a diagram illustrating how the disclosed system 300 provides a layer two end-to-end connection between a user device (e.g., user device 305*a*) and a company ground location (e.g., 340*a*), in accordance with at least one embodiment of the subject disclosure. In particular, in this figure, for example, the L2 end-to-end connection is shown to be between user device 305*a* and the default gateway 355*a* associated with user device 305*a*. It should be noted that, from the perspective of the user device 305*a*, the connection from the user device 305*a* to the default gateway 355*a* associated with the user device is simply an L2 connection.

Figure 6:
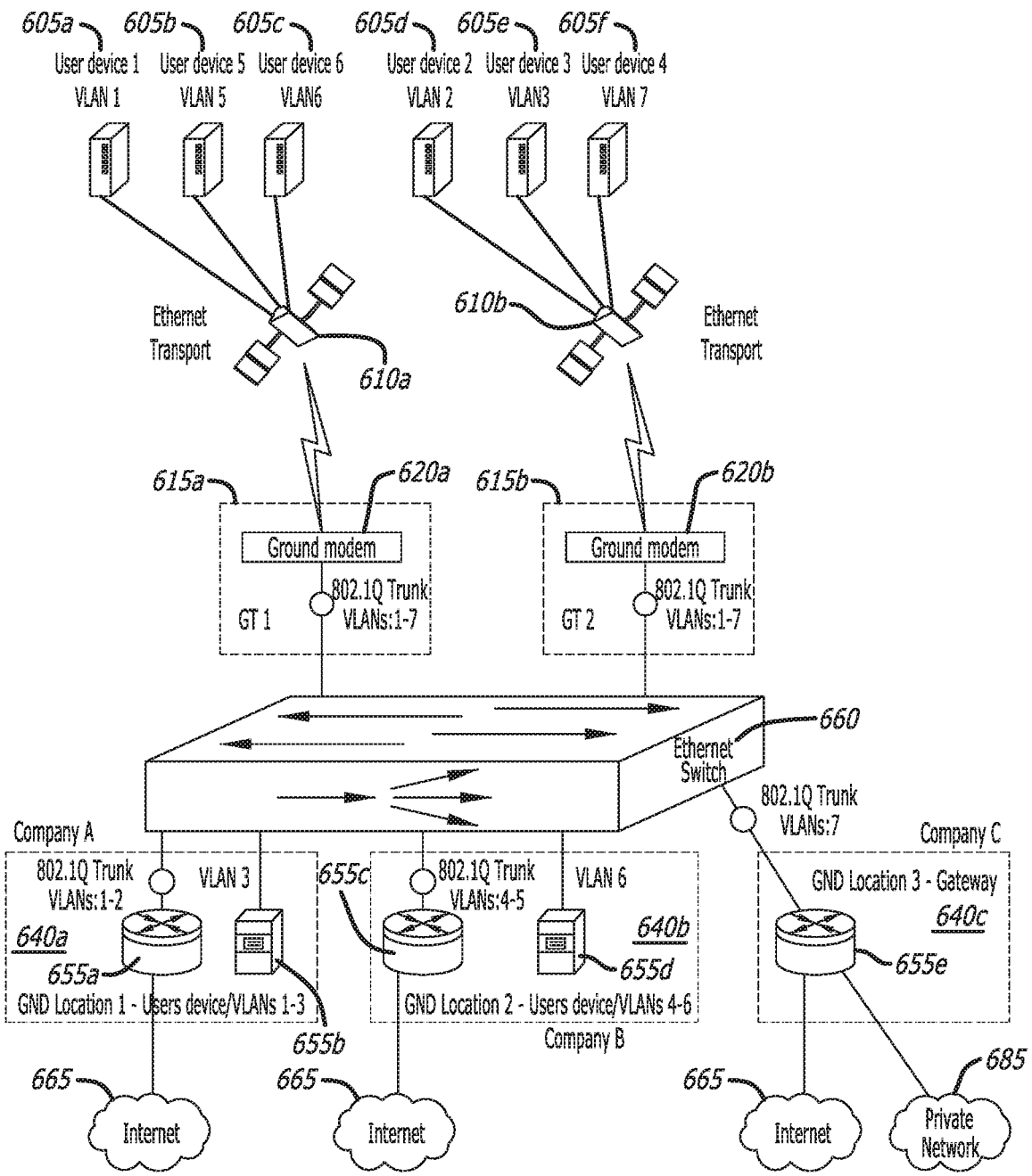
FIG. 6 is a diagram illustrating how the disclosed system operates as a virtual distributed Ethernet switch, in accordance with at least one embodiment of the subject disclosure.

FIG. 6 is a diagram illustrating how the disclosed system 600 operates as a virtual distributed Ethernet switch, in accordance with at least one embodiment of the subject disclosure. In this figure, six user devices (e.g., User Device 1 605*a*, User Device 5 605*b*, User Device 6 605*c*, User Device 2 605*d*, User Device 3 605*e*, and User Device 4 605*f*) are shown. Each user device 605*a*, 605*b*, 605*c*, 605*d*, 605*e*, 605*f* is associated with one of three companies (e.g., Company A, Company B, or Company C). Each user device 605*a*, 605*b*, 605*c*, 605*d*, 605*e*, 605*f* is assigned an IP address from a subnet assigned to a specific company VLAN (e.g., VLAN 1, VLAN 2, VLAN 3, VLAN 4, VLAN 5, VLAN 6, and VLAN 7). Three of the VLANs (e.g., VLAN 1, VLAN 2, and VLAN 3) are assigned to Company A, three VLANs (e.g., VLAN 4, VLAN 5, and VLAN 6) are assigned to Company B, and one VLAN (e.g., VLAN 7) is assigned to Company C.

Also in FIG. 6, two satellites 610*a*, 610*b* are shown. It should be noted that, in other embodiments, the system 600 may comprise more or less satellites 610*a*, 610*b* than two satellites as shown in FIG. 6.

Each of the user devices 605*a*, 605*b*, 605*c*, 605*d*, 605*e*, 605*f* is in communication with one of the satellites 610*a*, 610*b* that is within the user device's view (e.g., User Device 1 605*a* is in communication with satellite 110*a*), as shown in FIG. 6. Each of the satellites 610a, 610b is in communication with a ground terminal (GT) 615a, 615b that is within the satellite's view (e.g., satellite 610a is in communication with GT 1 615a, and satellite 610b is in communication with GT 2 615b), as shown in FIG. 6. It should be noted that in other embodiments, the system 600 may comprise more or less ground terminals 615a, 615b than two ground terminals as shown in FIG. 6.

Each ground terminal 615a, 615b comprises a ground modem 620a, 620b. The ground modem 620a, 620b of each ground terminal 615a, 615b is in communication with a customer ground location 640a, 640b, 640c via a virtual Ethernet switch 660. Each customer ground location (e.g., company headquarters) 640a, 640b, 640c is associated with a company (e.g., customer ground location 640a is associated with Company A, customer ground location 640b is associated with Company B, and customer ground location 640c is associated with Company C). Customer ground locations 640a, 640b, 640c are assigned VLANs and IP subnets for their user devices by a system operator (e.g., customer ground location 640a for Company A is assigned VLAN 1, VLAN 2, and VLAN 3; customer ground location 640b for Company B is assigned VLAN 4, VLAN 5, and VLAN 6 and customer ground location 640c for Company C is assigned VLAN 7). This allows for the companies (e.g., Company A, Company B, and Company C) to use any IP addressing scheme within their assigned VLANs. It should be noted that in other embodiments, the system 600 may comprise more or less customer ground locations 640a, 640b, 640c than three customer ground locations as shown in FIG. 6.

The virtual Ethernet switch 660 is configured to transport data from (and/or to) a user device to (and/or from) only a customer ground location that is assigned a VLAN, which is the same VLAN assigned to the user device. This means that user devices 605a, 605b, 605c, 605d, 605e, 605f can only connect to the customer ground location 640a, 640b, 640c assigned to a VLAN, which is the same as the user device's VLAN (e.g., the virtual Ethernet switch 660 will only transport data from user device 1 605a (assigned VLAN 1) to customer ground location 640a (assigned VLAN 1)).

Each customer ground location 640a, 640b, 640c comprises default gateways (DFGs) 655a, 655c, 655e and terrestrial user devices 655b, 655d. Default gateways 655a, 655c in this figure as shown as CE routers, which are connected to the internet 665. Default gateway 655e in this figure is shown as a CE router, which is connected to the internet 665 as well as a private network 685. Terrestrial user devices 655b, 655d are servers (e.g., data centers). Each default gateway 655a, 655c, 655e and terrestrial user device 655b, 655d is configured to support one or more company VLANs (e.g., default gateway 655a of Company A is configured to support VLAN 1 and VLAN 2, terrestrial user device 655b of Company A is configured to support VLAN 3, default gateway 655c of Company B is configured to support VLAN 4 and VLAN 5, terrestrial user device 655d of Company B is configured to support VLAN 6, and default gateway 655e of Company C is configured to support VLAN 7). Each user device is associated with the same VLAN as the user device's default gateway or terrestrial user device (e.g., user device 605a and default gateway 655a are both associated with VLAN 1).

Figure 7:
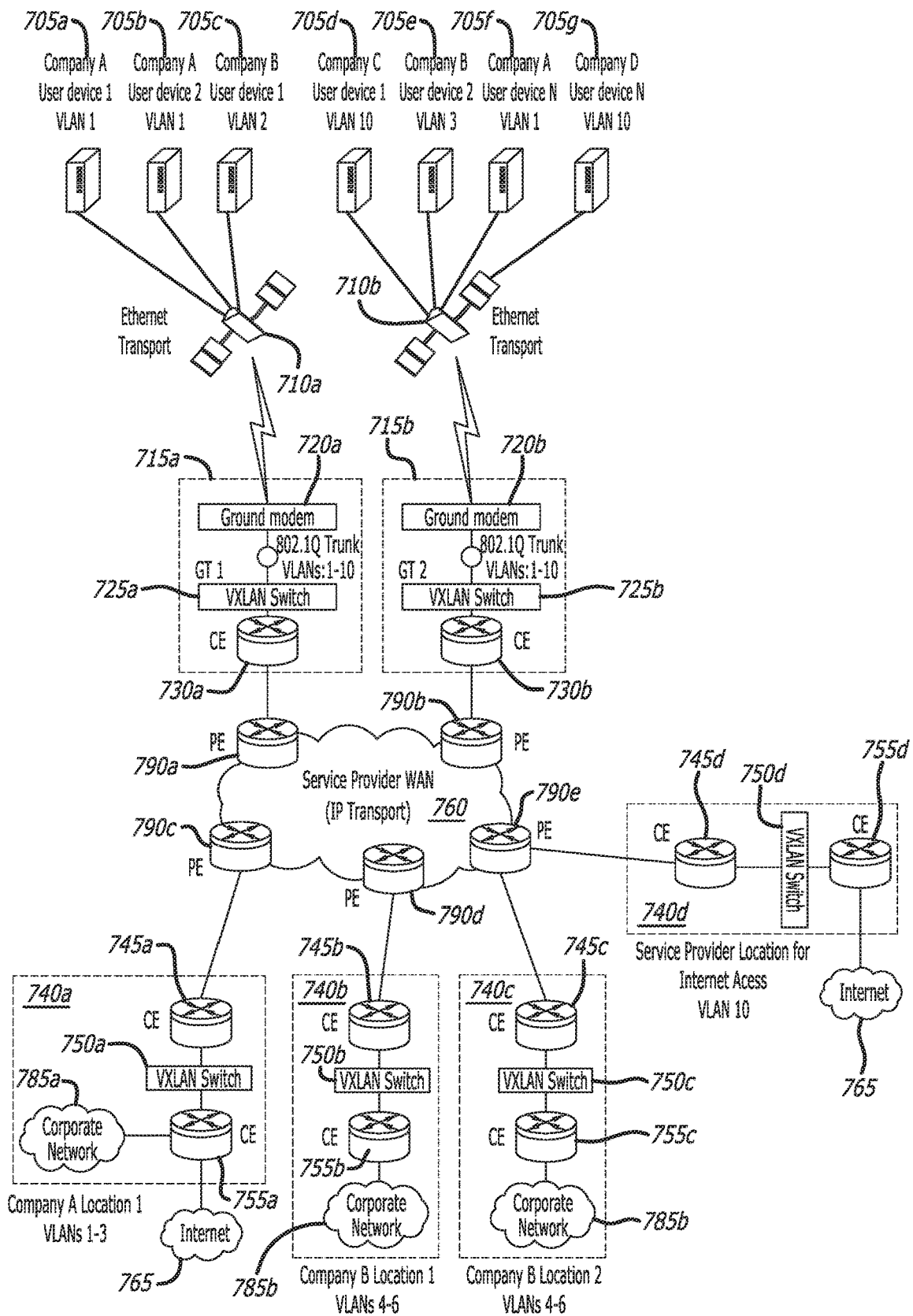
FIG. 7 is a diagram showing the disclosed system, along with expanded details, for user mobility in a system with time-varying user-satellite and satellite-ground Ethernet links utilizing a VXLAN configuration, in accordance with at least one embodiment of the subject disclosure.

FIG. 7 is a diagram showing the disclosed system 700, along with expanded details, for user mobility in a system with time-varying user-satellite and satellite-ground Ethernet links utilizing a VXLAN configuration, in accordance with at least one embodiment of the subject disclosure. In this figure, seven user devices (e.g., Company A User Device 1 705a, Company A User Device 2 705b, Company B User Device 1 705c, Company C User Device 1 705d, Company B User Device 2 705e, Company A User Device N 705f, and Company D User Device N 705g) are shown. Each user device 705a, 705b, 705c, 705d, 705e, 705f, 705g is associated with one of four companies (e.g., Company A, Company B, Company C, or Company D). Each user device 705a, 705b, 705c, 705d, 705e, 705f, 705g is assigned an IP address from a subnet assigned to a specific company VLAN (e.g., VLAN 1, VLAN 2, VLAN 3, VLAN 4, VLAN 5, VLAN 6, VLAN 7, VLAN 8, VLAN 9, and VLAN 10).

Also in FIG. 7, two satellites 710a, 710b are shown. Each of the user devices 705a, 705b, 705c, 705d, 705e, 705f, 705g is in communication with one of the satellites 710a, 710b that is within the user device's view (e.g., Company A User Device 1 705a is in communication with satellite 710a), as shown in FIG. 7. Each of the satellites 710a, 710b is in communication with a ground terminal 715a, 715b that is within the satellite's view (e.g., satellite 710a is in communication with ground terminal 1 715a, and satellite 710b is in communication with ground terminal 2 715b), as shown in FIG. 7.

VXLAN capable switches (e.g., a VXLAN L3 switch) 725a, 725b are deployed at ground terminals 715a, 715b. Each ground terminal 715a, 715b comprises a ground modem 720a, 720b, a VXLAN capable switch 725a, 725b, and a customer edge (CE) router 730a, 730b. Each VXLAN capable switch 725a, 725b is configured to support all ten VLANs (e.g., VLAN 1, VLAN 2, VLAN 3, VLAN 4, VLAN 5, VLAN 6, VLAN 7, VLAN 8, VLAN 9, and VLAN 10). This means that user devices 705a, 705b, 705c, 705d, 705e, 705f, 705g from any company (e.g., Company A, Company B, Company C, or Company D) can connect to any ground terminal 715a, 715b.

Each CE router 730a, 730b of each ground terminal 715a, 715b is in communication with a customer ground location 740a, 740b, 740c or a service provider location 740d via PE routers 790a, 790b, 790c, 790d over a network (e.g., a wide area network (WAN), such as the Internet) 760. Each customer ground location (e.g., company headquarters or location) 740a, 740b, 740c is associated with a company (e.g., customer ground location 740a is associated with Company A, customer ground location 740b is associated with Company B, and customer ground location 740c is also associated with Company B). Customer ground locations 740a, 740b, 740c and service provider location 740d are assigned VLANs and IP subnets for their user devices by a system operator (e.g., customer ground location 740a for Company A is assigned VLAN 1, VLAN 2, and VLAN 3; customer ground location 740b for Company B is assigned VLAN 4, VLAN 5, and VLAN 6; customer ground location 740c for Company B is assigned VLAN 4, VLAN 5, and VLAN 6; and service provider location 740d is assigned VLAN 10). This allows for the companies (e.g., Company A, Company B, Company C, and Company D) to use any IP addressing scheme within their assigned VLANs. It should be noted that in other embodiments, the system 700 may comprise more or less customer ground locations 740a, 740b, 740c than three customer ground locations and/or more or less service provider locations than one service provider location 740d, as is shown in FIG. 7.

VXLAN capable switches (e.g., a VXLAN L3 switch) 750a, 750b, 750c, 750d are deployed at the customer ground locations 740a, 740b, 740c and service provider location 740d. Each VXLAN capable switch 750a, 750b, 750c, 750d is configured to transport only their assigned VLANs (e.g., the VLANs assigned to each company). This means that user devices 705a, 705b, 705c, 705d, 705e, 705f, 705g can only connect to the customer ground location 740a, 740b, 740c and the service provider location 740d assigned to the user device's company (e.g., Company A, Company B, Company C, or Company D).

Each customer ground location 740a, 740b, 740c and service provider location 740d comprises a CE router 745a, 745b, 745c, 745d, a VXLAN capable switch 750a, 750b, 750c, 750d, and a default gateway (DFG) 755a, 755b, 755c, 755d. Default gateway 755d is a CE router, which is connected to the internet 765; default gateway 755a is a CE router, which is connected to the internet 765 as well as a corporate network (e.g., private network) 785a for Company A; and default gateways 755b, 755c are CE routers, which are connected to a corporate network (e.g., private network) 785b for company B. Each default gateway 755a, 755b, 755c, 755d is configured to support one or more company VLANs (e.g., default gateway 755a of Company A is configured to support VLAN 1, VLAN 2, VLAN 3; default gateway 755b of Company B is configured to support VLAN 4, VLAN 5, VLAN 6; default gateway 755c of Company B is configured to support VLAN 4, VLAN 5, VLAN 6; and default gateway 755d is configured to support VLAN 10). Each user device is associated with the same VLAN as the user device's default gateway (e.g., user device 705a and default gateway 755a are both associated with VLAN 1).

Figure 8:
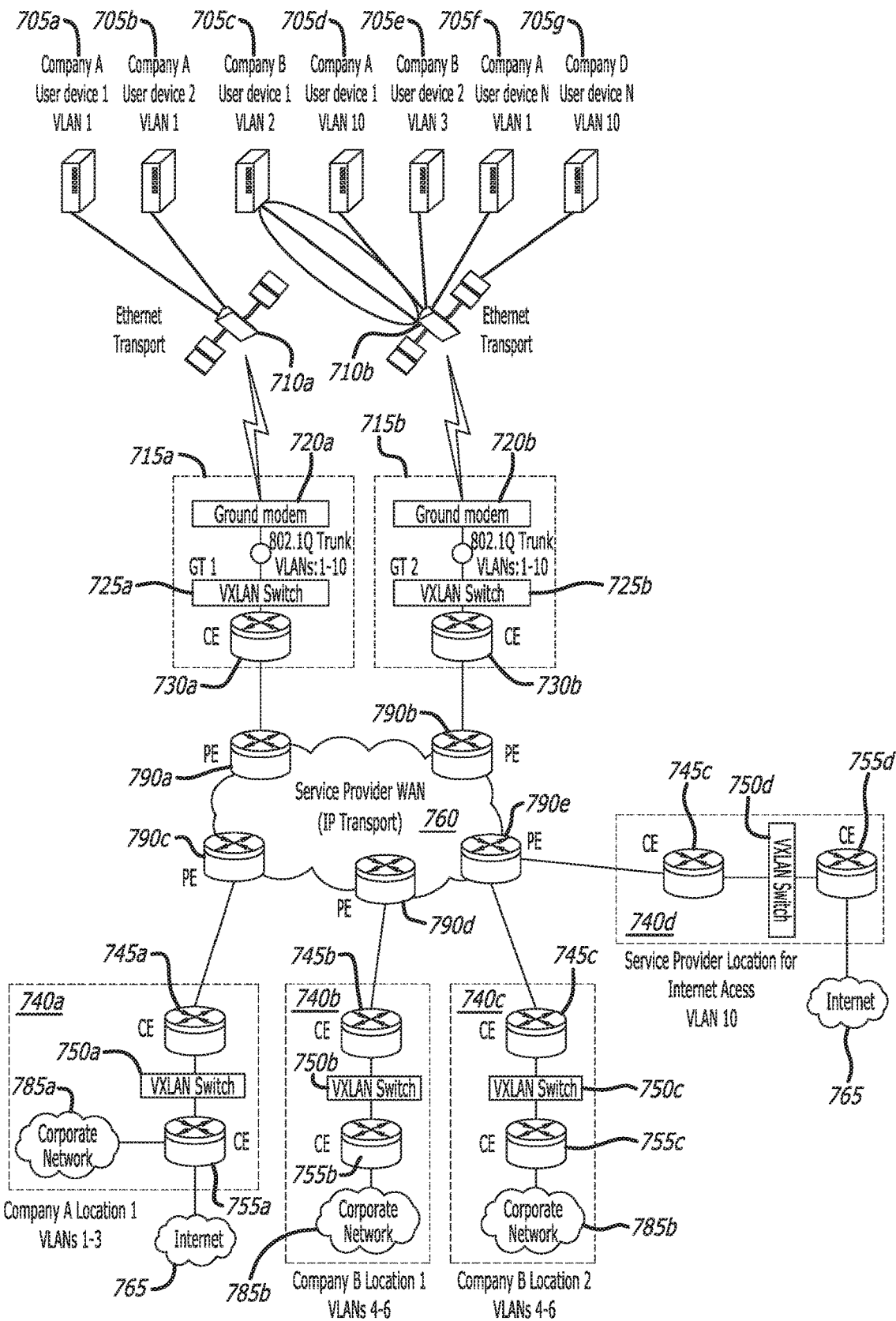
FIG. 8 is a diagram illustrating the disclosed system performing a user device handover operation, in accordance with at least one embodiment of the subject disclosure.

FIG. 8 is a diagram illustrating the disclosed system 700 performing a user device handover operation, in accordance with at least one embodiment of the subject disclosure. In particular, when viewed in conjunction with FIG. 7, FIG. 8 shows a user device handover operation for user device 705c of system 700. Specifically, in FIG. 7, user device 705c is shown to be in communication with satellite 710a, which is in the view of user device 705c. When satellite 710a is no longer in the view of user device 705c, user device 705c will no longer be in communication with satellite 710a. User device 705c will then be in communication with a satellite, which is within the view of user device 705c. As shown in FIG. 8, user device 705c is in communication with satellite 710b, which is now within the view of user device 705c. It should be noted that when the user device 705c moves between satellites 710a, 710b, traffic to/from the user device 705c is rerouted to the other satellite 710b without utilizing a dynamic routing protocol (e.g., by leveraging dynamic Ethernet media access control (MAC) learning capabilities inherent to the deployed layer 2 overlay implementation or WAN layer 2 VPN).

Figure 9:
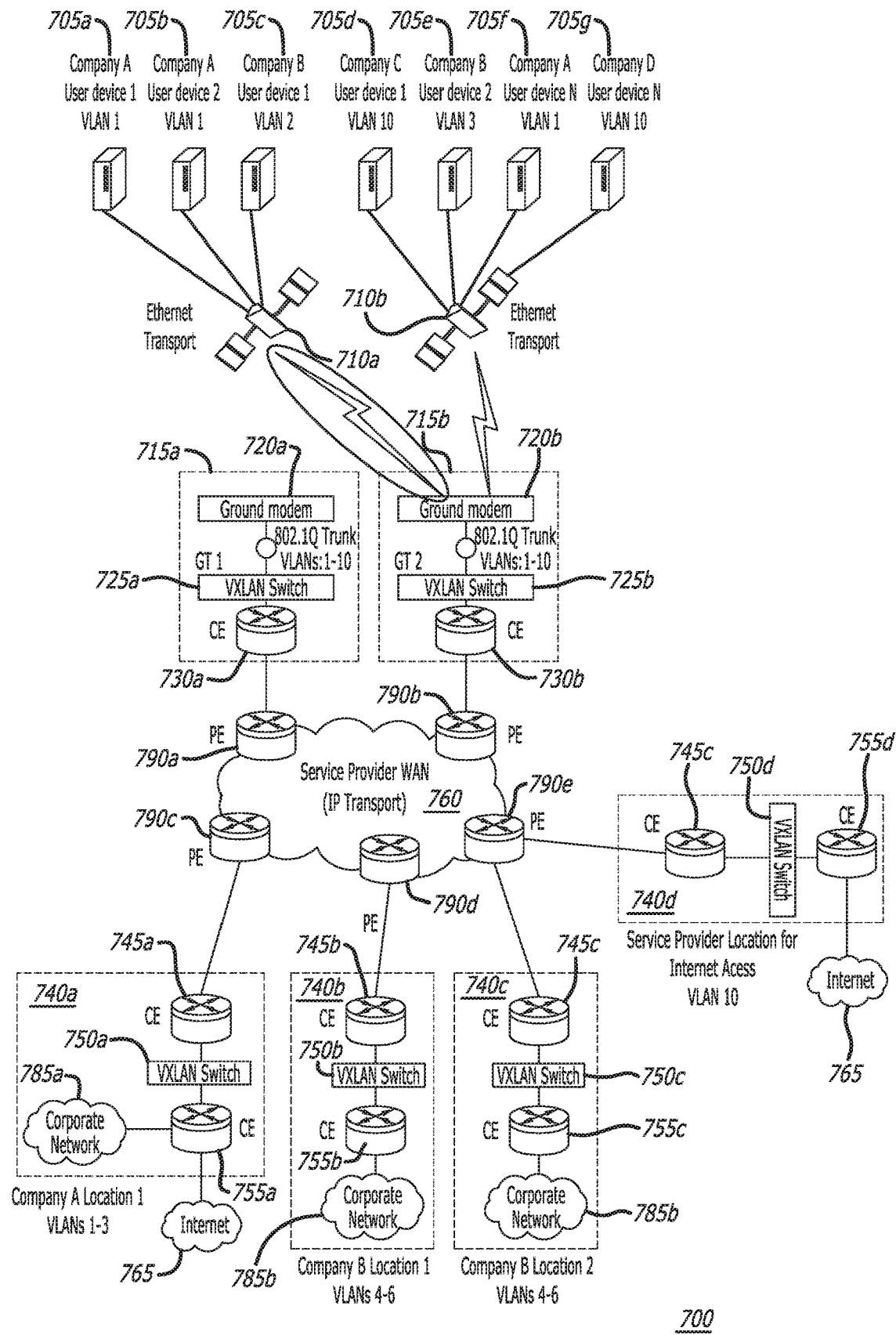
FIG. 9 is a diagram illustrating the disclosed system performing a ground terminal handover operation, in accordance with at least one embodiment of the subject disclosure.

FIG. 9 is a diagram illustrating the disclosed system 700 performing a ground terminal handover operation, in accordance with at least one embodiment of the subject disclosure. In particular, when viewed in conjunction with FIG. 7, FIG. 9 shows a ground terminal handover operation for satellite 710a of system 700. Specifically, in FIG. 7, satellite 710a is shown to be in communication with ground terminal 715a, which is in the view of satellite 710a. When ground terminal 715a is no longer in the view of satellite 710a, satellite 710a will no longer be in communication with ground terminal 715a. Satellite 710a will then be in communication with a ground terminal, which is within the view of satellite 710a. As shown in FIG. 9, satellite 710a is in communication with ground terminal 715b, which is now within the view of satellite 710a. It should be noted that when the user device (e.g., user device 705c) moves between ground terminals 715a, 715b, traffic to/from the user device is rerouted to the other ground terminal 715b without utilizing a dynamic routing protocol (e.g., by leveraging dynamic Ethernet MAC learning capabilities inherent to the deployed layer 2 overlay implementation or WAN layer 2 VPN).

Figure 10:
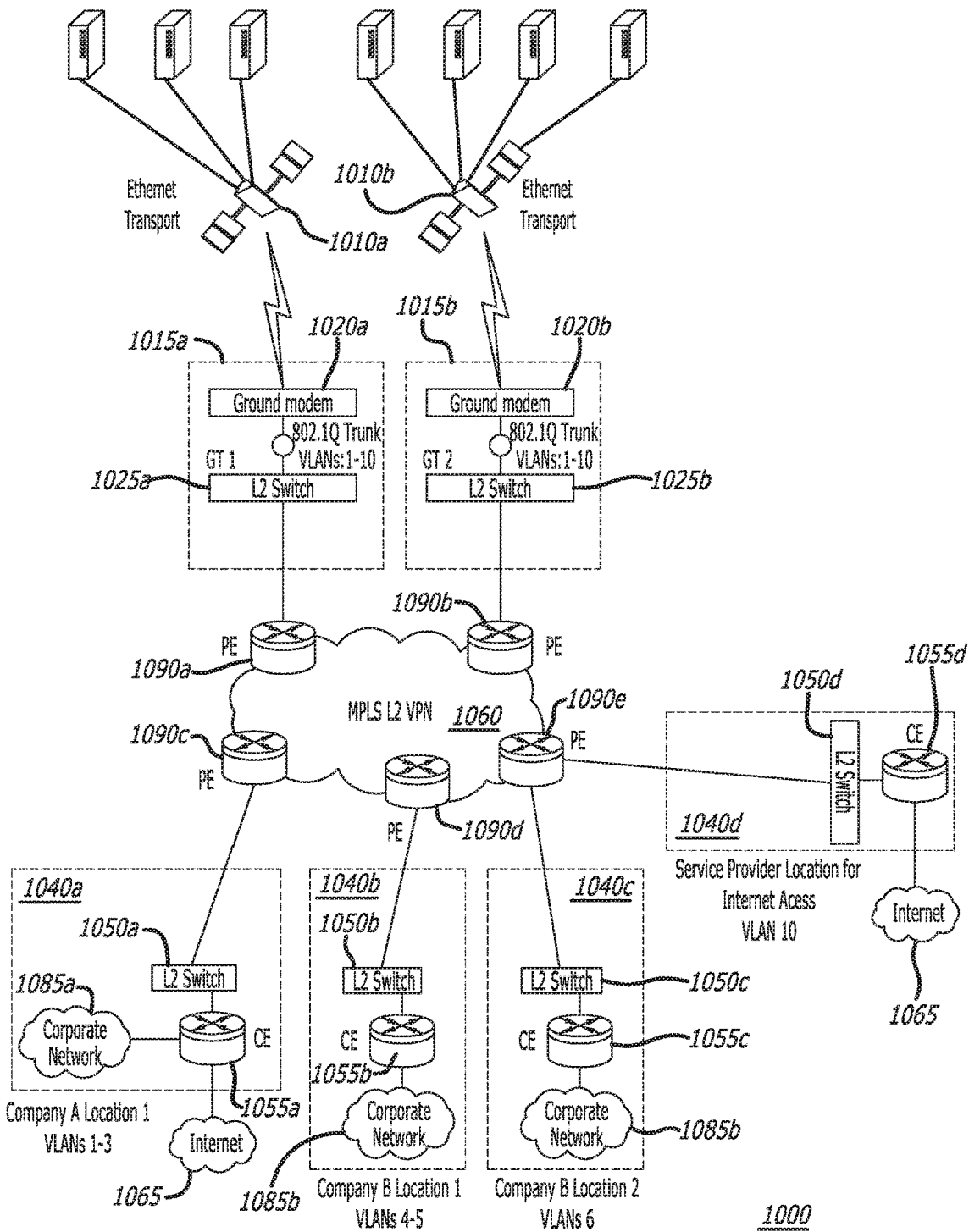
FIG. 10 is a diagram showing the disclosed system, along with expanded details, for user mobility in a system with time-varying user-satellite and satellite-ground Ethernet links utilizing a MPLS L2 VPN configuration, in accordance with at least one embodiment of the subject disclosure.

FIG. 10 is a diagram showing the disclosed system 1000, along with expanded details, for user mobility in a system with time-varying user-satellite and satellite-ground Ethernet links utilizing a MPLS L2 VPN configuration, in accordance with at least one embodiment of the subject disclosure. In this figure, seven user devices (e.g., Company A User Device 1 1005a, Company A User Device 2 1005b, Company B User Device 1 1005c, Company C User Device 1 1005d, Company B User Device 2 1005e, Company B User Device 3 1005f, and Company D User Device 1 1005g) are shown. Each user device 1005a, 1005b, 1005c, 1005d, 1005e, 1005f, 1005g is associated with one of four companies (e.g., Company A, Company B, Company C, or Company D). Each user device 1005a, 1005b, 1005c, 1005d, 1005e, 1005f, 1005g is assigned an IP address from a subnet assigned to a specific company VLAN (e.g., VLAN 1, VLAN 2, VLAN 3, VLAN 4, VLAN 5, VLAN 6, VLAN 7, VLAN 8, VLAN 9, and VLAN 10).

Also in FIG. 10, two satellites 1010a, 1010b are shown. Each of the user devices 1005a, 1005b, 1005c, 1005d, 1005e, 1005f, 1005g is in communication with one of the satellites 1010a, 1010b that is within the user device's view (e.g., Company A User Device 1 1005a is in communication with satellite 1010a), as shown in FIG. 10. Each of the satellites 1010a, 1010b is in communication with a ground terminal 1015a, 1015b that is within the satellite's view (e.g., satellite 1010a is in communication with ground terminal 1 1015a, and satellite 1010b is in communication with ground terminal 2 1015b), as shown in FIG. 10.

Switches (e.g., an L2 switch) 1025a, 1025b are deployed at ground terminals 1015a, 1015b. Each ground terminal 1015a, 1015b comprises a ground modem 1020a, 1020b and a switch 1025a, 1025b. Each switch 1025a, 1025b is configured to support all ten VLANs (e.g., VLAN 1, VLAN 2, VLAN 3, VLAN 4, VLAN 5, VLAN 6, VLAN 7, VLAN 8, VLAN 9, and VLAN 10). This means that user devices 1005a, 1005b, 1005c, 1005d, 1005e, 1005f, 1005g from any company (e.g., Company A, Company B, Company C, or Company D) can connect to any ground terminal 1015a, 1015b.

Each switch 1025a, 1025b of each ground terminal 1015a, 1015b is in communication with a customer ground location 1040a, 1040b, 1040c or a service provider location 1040d via PE routers 1090a, 1090b, 1090c, 1090d over an MPLS L2 VPN 1060. Each customer ground location (e.g., company headquarters or location) 1040a, 1040b, 1040c is associated with a company (e.g., customer ground location 1040a is associated with Company A, customer ground location 1040b is associated with Company B, and customer ground location 1040c is also associated with Company B). Customer ground locations 1040a, 1040b, 1040c and service provider location 1040d are assigned VLANs and IP subnets for their user devices by a system operator (e.g., customer ground location 1040a for Company A is assigned VLAN 1, VLAN 2, and VLAN 3; customer ground location 1040b for Company B is assigned VLAN 4, VLAN 5, and VLAN 6; customer ground location 1040c for Company B is assigned VLAN 4, VLAN 5, and VLAN 6; and service provider location 1040d is assigned VLAN 10). This allows for the companies (e.g., Company A, Company B, Company C, and Company D) to use any IP addressing scheme within their assigned VLANs. It should be noted that in other embodiments, the system 1000 may comprise more or less customer ground locations 1040a, 1040b, 1040c than three customer ground locations and/or more or less service provider locations 1040d than one service provider location, as is shown in FIG. 7.

Switches (e.g., an L2 switch) 1050a, 1050b, 1050c, 1050d are deployed at the customer ground locations 1040a, 1040b, 1040c and the service provider location 1040d. Each L2 switch 1050a, 1050b, 1050c, 1050d is configured to transport only their assigned VLANs (e.g., the VLANs assigned to each company). This means that user devices 1005a, 1005b, 1005c, 1005d, 1005e, 1005f, 1005g can only connect to the customer ground location 1040a, 1040b, 1040c and service provider location 1040d assigned to the user device's company (e.g., Company A, Company B, Company C, or Company D).

Each customer ground location 1040a, 1040b, 1040c and service provider location 1040d comprises a switch 1050a, 1050b, 1050c, 1050d and a default gateway (DFG) 1055a, 1055b, 1055c, 1055d. Default gateway 1055d is a CE router, which is connected to the internet 1065; default gateway 1055a is a CE router, which is connected to the internet 1065 as well as a corporate network (e.g., private network) 1085a for Company A; and default gateways 1055b, 1055c are CE routers, which are connected to a corporate network (e.g., private network) 1085b for company B. Each default gateway 1055a, 1055b, 1055c, 1055d is configured to support one or more company VLANs (e.g., default gateway 1055a of Company A is configured to support VLAN 1, VLAN 2, VLAN 3; default gateway 1055b of Company B is configured to support VLAN 4 and VLAN 5; default gateway 1055c of Company B is configured to support VLAN 6; and default gateway 1055d is configured to support VLAN 10). Each user device is associated with the same VLAN as the user device's default gateway (e.g., user device 1005a and default gateway 1055a are both associated with VLAN 1).

Figure 11:
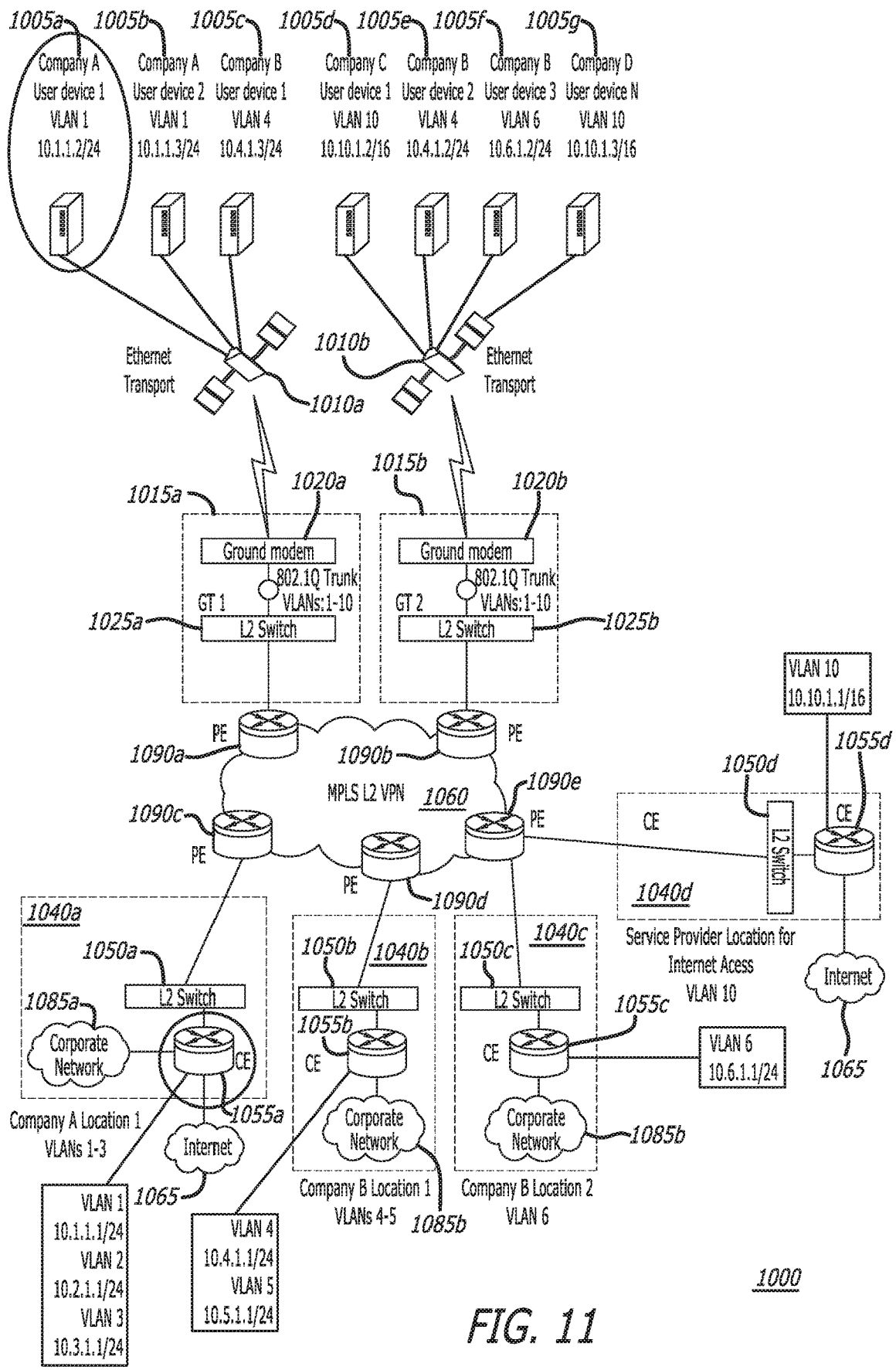
FIG. 11 is a diagram illustrating the assignment of internet protocol (IP) addresses in the disclosed system, in accordance with at least one embodiment of the subject disclosure.

FIG. 11 is a diagram illustrating the assignment of internet protocol (IP) addresses in the disclosed system 1000, in accordance with at least one embodiment of the subject disclosure. In this figure, the user devices 1005a, 1005b, 1005c, 1005d, 1005e, 1005f, 1005g are shown to be assigned specific VLANs (e.g., VLAN 1, VLAN 2, VLAN 3, VLAN 4, VLAN 5, VLAN 6, VLAN 7, VLAN 8, VLAN 9, and VLAN 10) and specific IP addresses and subnets (e.g. user device 1005a is assigned 10.1.1.2/24, user device 1005b is assigned 10.1.1.3/24, user device 1005c is assigned 10.4.1.3/24, user device 1005d is assigned 10.10.1.2/16, user device 1005e is assigned 10.4.1.2/24, user device 1005f is assigned 10.6.1.2/24, and user device 1005g is assigned 10.10.1.3/16. Also shown in this figure, the default gateways 1055a, 1055b, 1055c, 1055d are assigned specific VLANs and IP addresses. The user devices can connect with the default gateways that have corresponding VLANs (e.g. user device 1005a, which is assigned VLAN 1, can connect with default gateway 1055a, which is also assigned VLAN 1).

Further, the disclosure comprises embodiments according to the following clauses:

Clause 1. A method, comprising:
transmitting, by a user device, a first signal comprising internet protocol (IP) data packets encapsulated in an Ethernet frame to a satellite;
transmitting, by the satellite, a second signal comprising the IP data packets encapsulated in the Ethernet frame to a ground terminal;
putting, by a first virtual extensible local area network (VXLAN) switch associated with the ground terminal, the Ethernet frame of the IP data packets into a user datagram protocol (UDP) payload;
putting, by the first VXLAN switch, the UDP payload into the IP data packets to generate a third signal comprising the IP data packets comprising the UDP payload;
transmitting, by the first VXLAN switch, the third signal to a customer ground location via IP transport over a wide area network (WAN);
de-encapsulating, by a second VXLAN switch associated with the customer ground location, the Ethernet frame from the third signal to generate a fourth signal comprising the IP data packets encapsulated in the Ethernet frame; and
transmitting, by the second VXLAN switch, the fourth signal to a default gateway associated with the user device.

Clause 2. The method of clause 1, wherein the first VXLAN switch and the second VXLAN switch are each a layer three (L3) switch with VXLAN capability.

Clause 3. The method of clause 1, wherein the first signal and the second signal are each one of a radio frequency (RF) signal or an optical signal.

Clause 4. The method of clause 1, wherein the satellite is one of a geostationary Earth orbit (GEO) satellite, a medium Earth orbit (MEO) satellite, or a low Earth orbit (LEO) satellite.

Clause 5. The method of clause 1, wherein the satellite transmits the second signal to a ground modem of the ground terminal.

Clause 6. The method of clause 5, wherein the method further comprises transmitting, by the ground modem, a fifth signal comprising the IP data packets encapsulated in the Ethernet frame to the first VXLAN switch.

Clause 7. The method of clause 1, wherein the first VXLAN switch transmits the third signal to the customer ground location via a first customer edge (CE) router associated with the ground terminal and a second CE router associated with the customer ground location.

Clause 8. The method of clause 1, wherein the user device and the default gateway are associated with the same virtual local area network (VLAN).

Clause 9. The method of clause 1, wherein the default gateway is associated with an IP address assigned to the user device.

Clause 10. The method of clause 1, wherein the user device is associated with a customer, which is associated with the customer ground location.

Clause 11. The method of clause 1, wherein the method further comprises:
ceasing transmitting, by the user device, the first signal to the satellite; and
transmitting, by the user device, the first signal to another satellite,
wherein communication associated with the user device is rerouted to the other satellite without utilizing a dynamic routing protocol.

Clause 12. The method of clause 1, wherein the method further comprises:
ceasing transmitting, by the satellite, the second signal to the ground terminal; and transmitting, by the satellite, the second signal to another ground terminal,
wherein communication associated with the user device is rerouted to the other ground terminal via the satellite without utilizing a dynamic routing protocol.

Clause 13. A method, comprising:
transmitting, by a user device, a first signal comprising internet protocol (IP) data packets encapsulated in an Ethernet frame to a satellite;
transmitting, by the satellite, a second signal comprising the IP data packets encapsulated in the Ethernet frame to a ground terminal;

putting, by a first provider edge (PE) router, the Ethernet frame of the IP data packets into a multi-protocol label switching (MPLS) payload to generate a third signal comprising MPLS data packets;

transmitting, by the first PE router, the third signal to a second PE router via a MPLS layer two (L2) virtual private network (VPN);

de-encapsulating, by the second PE router, the Ethernet frame from the third signal to generate a fourth signal comprising the IP data packets encapsulated in the Ethernet frame; and transmitting, by the second PE router, the fourth signal to a default gateway associated with the user device.

Clause 14. The method of clause 13, wherein the ground terminal comprises a first switch and a customer ground location comprises a second switch, and wherein the first switch and the second switch are each a layer two (L2) switch.

Clause 15. The method of clause 13, wherein the satellite transmits the second signal to a ground modem of the ground terminal.

Clause 16. The method of clause 15, wherein the method further comprises transmitting, by the ground modem, a fifth signal comprising the IP data packets encapsulated in the Ethernet frame to a first switch of the ground terminal.

Clause 17. The method of clause 13, wherein a first switch of the ground terminal transmits a sixth signal comprising the IP data packets encapsulated in the Ethernet frame to the first PE router.

Clause 18. The method of clause 13, wherein the user device and the default gateway are associated with the same virtual local area network (VLAN).

Clause 19. The method of clause 13, wherein the method further comprises:

ceasing transmitting, by the user device, the first signal to the satellite; and transmitting, by the user device, the first signal to another satellite, wherein the user device is rerouted to the other satellite without utilizing a dynamic routing protocol.

Clause 20. A system, comprising:

A processor; and

A memory that stores executable instructions that, when executed by the processor, facilitate performance of operations, comprising:

receiving, by a ground modem of a ground terminal, a first signal comprising internet protocol (IP) data packets encapsulated in an Ethernet frame, wherein the receiving comprises receiving the first signal from a user device via a satellite; and transmitting, by the ground modem, a second signal comprising the IP data packets encapsulated in the Ethernet frame to a default gateway device via a virtual Ethernet switch, wherein the default gateway device comprises a gateway device of a customer ground location associated with the user device, wherein the virtual Ethernet switch utilizes one of a layer two (L2) overlay or a wide area network (WAN) L2 virtual private network (VPN) implementation.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the subject disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

I claim:

1. A method, comprising:

transmitting, by a user device, a first signal comprising internet protocol (IP) data packets encapsulated in an Ethernet frame to a satellite;

transmitting, by the satellite, a second signal comprising the IP data packets encapsulated in the Ethernet frame to a ground terminal;

putting, by a first virtual extensible local area network (VXLAN) switch associated with the ground terminal, the Ethernet frame of the IP data packets into a user datagram protocol (UDP) payload;

putting, by the first VXLAN switch, the UDP payload into the IP data packets to generate a third signal;

transmitting, by the first VXLAN switch, the third signal to a customer ground location via IP transport over a wide area network (WAN);

de-encapsulating, by a second VXLAN switch associated with the customer ground location, the Ethernet frame from the third signal to generate a fourth signal comprising the IP data packets encapsulated in the Ethernet frame; and transmitting, by the second VXLAN switch, the fourth signal to a default gateway associated with the user device.

2. The method of claim 1, wherein the first VXLAN switch and the second VXLAN switch are each a layer three (L3) switch with VXLAN capability.

3. The method of claim 1, wherein the first signal and the second signal are each one of a radio frequency (RF) signal or an optical signal.

4. The method of claim 1, wherein the satellite is one of a geostationary Earth orbit (GEO) satellite, a medium Earth orbit (MEO) satellite, or a low Earth orbit (LEO) satellite.

5. The method of claim 1, wherein the satellite transmits the second signal to a ground modem of the ground terminal.

6. The method of claim 5, wherein the method further comprises transmitting, by the ground modem, a fifth signal comprising the IP data packets encapsulated in the Ethernet frame to the first VXLAN switch.

7. The method of claim 1, wherein the first VXLAN switch transmits the third signal to the customer ground location via a first customer edge (CE) router associated with the ground terminal and a second CE router associated with the customer ground location.

8. The method of claim 1, wherein the user device and the default gateway are associated with the same virtual local area network (VLAN).

9. The method of claim 1, wherein the default gateway is associated with an IP address assigned to the user device.

10. The method of claim 1, wherein the user device is associated with a customer, which is associated with the customer ground location.

11. The method of claim 1, wherein the method further comprises:
 ceasing transmitting, by the user device, the first signal to the satellite; and
 transmitting, by the user device, the first signal to another satellite,
 wherein communication associated with the user device is rerouted to the other satellite without utilizing a dynamic routing protocol.

12. The method of claim 1, wherein the method further comprises:
 ceasing transmitting, by the satellite, the second signal to the ground terminal; and transmitting, by the satellite, the second signal to another ground terminal,
 wherein communication associated with the user device is rerouted to the other ground terminal via the satellite without utilizing a dynamic routing protocol.

13. A method, comprising:
 transmitting, by a user device, a first signal comprising internet protocol (IP) data packets encapsulated in an Ethernet frame to a satellite;
 transmitting, by the satellite, a second signal comprising the IP data packets encapsulated in the Ethernet frame to a ground terminal;
 putting, by a first provider edge (PE) router, the Ethernet frame of the IP data packets into a multi-protocol label switching (MPLS) payload to generate a third signal comprising MPLS data packets;
 transmitting, by the first PE router, the third signal to a second PE router via a MPLS layer two (L2) virtual private network (VPN);
 de-encapsulating, by the second PE router, the Ethernet frame from the third signal to generate a fourth signal comprising the IP data packets encapsulated in the Ethernet frame; and
 transmitting, by the second PE router, the fourth signal to a default gateway associated with the user device.

14. The method of claim 13, wherein the ground terminal comprises a first switch and a customer ground location comprises a second switch, and
 wherein the first switch and the second switch are each a layer two (L2) switch.

15. The method of claim 13, wherein the satellite transmits the second signal to a ground modem of the ground terminal.

16. The method of claim 15, wherein the method further comprises transmitting, by the ground modem, a fifth signal comprising the IP data packets encapsulated in the Ethernet frame to a first switch of the ground terminal.

17. The method of claim 13, wherein a first switch of the ground terminal transmits a sixth signal comprising the IP data packets encapsulated in the Ethernet frame to the first PE router.

18. The method of claim 13, wherein the user device and the default gateway are associated with the same virtual local area network (VLAN).

19. The method of claim 13, wherein the method further comprises:
 ceasing transmitting, by the user device, the first signal to the satellite; and
 transmitting, by the user device, the first signal to another satellite,
 wherein the user device is rerouted to the other satellite without utilizing a dynamic routing protocol.

20. A system to perform the method of claim 13, the system comprising:
 a processor; and
 a memory that stores executable instructions that, when executed by the processor, facilitate performance of operations, comprising:
  receiving, by a ground modem of the ground terminal, the second signal comprising the IP data packets encapsulated in the Ethernet frame; and
  transmitting, by the ground modem, a fifth signal comprising the IP data packets encapsulated in the Ethernet frame to a default gateway device via a virtual Ethernet switch, wherein the default gateway device comprises a gateway device of a customer ground location associated with the user device,
  wherein the virtual Ethernet switch utilizes one of a layer two (L2) overlay or a wide area network (WAN) L2 virtual private network (VPN) implementation.

* * * * *